(12) United States Patent
Robertson et al.

(10) Patent No.: US 6,877,655 B1
(45) Date of Patent: Apr. 12, 2005

(54) PROVIDING SERVICES UTILIZING A SMART CARD

(75) Inventors: Philip Keith Robertson, New South Wales (AU); Sue-Ken Yap, New South Wales (AU); Andrew Timothy Robert Newman, New South Wales (AU)

(73) Assignee: Canon Kabushiki Kaisha, Tokyo (JP)

( * ) Notice: Subject to any disclaimer, the term of this patent is extended or adjusted under 35 U.S.C. 154(b) by 232 days.

(21) Appl. No.: 09/630,283

(22) Filed: Aug. 1, 2000

(30) Foreign Application Priority Data

| Aug. 4, 1999 | (AU) | PQ2010 |
| Aug. 4, 1999 | (AU) | PQ2015 |
| Aug. 4, 1999 | (AU) | PQ2016 |
| Aug. 4, 1999 | (AU) | PQ2017 |

(51) Int. Cl.[7] .......................................... G06F 17/00
(52) U.S. Cl. .................... 235/375; 235/380; 235/492
(58) Field of Search ................................ 235/380, 375, 235/492, 436, 376, 383; 705/41, 10, 424; 348/10, 13

(56) References Cited

U.S. PATENT DOCUMENTS

| 3,890,461 | A | * | 6/1975 | Vogelman et al. | 380/228 |
| 4,766,542 | A | | 8/1988 | Pilarczyk | 364/413 |
| 4,868,376 | A | * | 9/1989 | Lessin et al. | 235/492 |
| 5,002,062 | A | | 3/1991 | Suzuki | 128/696 |
| 5,049,728 | A | * | 9/1991 | Rovin | 235/492 |
| 5,353,016 | A | | 10/1994 | Kurita et al. | 340/825.22 |
| 5,583,539 | A | | 12/1996 | Hiketa et al. | 345/146 |
| 5,601,489 | A | | 2/1997 | Komaki | 463/44 |
| 5,767,896 | A | * | 6/1998 | Nemirofsky | 725/23 |
| 5,835,864 | A | | 11/1998 | Diehl et al. | 455/602 |
| 5,880,769 | A | | 3/1999 | Nemirofsky et al. | 348/12 |

(Continued)

FOREIGN PATENT DOCUMENTS

| AU | 28896/95 | 2/1996 | |
| AU | 742974 | 4/2000 | ............ G06F/3/23 |
| DE | 3637684 | 5/1987 | |
| EP | 0 469 581 | 2/1992 | |
| EP | 0 816 989 | 1/1998 | |
| EP | 0 827 733 | 3/1998 | |
| EP | 10-39772 | 7/1999 | |
| EP | 992 953 A2 | 4/2000 | ............ G07F/7/10 |
| FR | 2 721 730 | 12/1995 | |
| FR | 2 753 088 | 9/1996 | ............ A61J/7/04 |
| JP | 59-123986 | 7/1984 | |
| JP | 04-088547 | 3/1992 | |
| JP | 03-071329 | 6/2000 | |
| JP | U03-071329 | 6/2000 | |
| WO | 95/35534 | 7/1995 | |
| WO | 98/40863 | 9/1998 | |

*Primary Examiner*—Michael G. Lee
*Assistant Examiner*—Uyen-Chau N. Le
(74) *Attorney, Agent, or Firm*—Fitzpatrick, Cella, Harper & Scinto

(57) ABSTRACT

The method provides services using a smart card 10 (100 or 200). The services are provided by a third party other than the original equipment manufacturing (OEM) of the smart card. The method comprises the following steps. The method generates 1506 a plurality of data, where each of the data comprises information for activating a service associated with an electrical apparatus. The method also generates 1505 an indicium associated with each data. The method then programmes 1518 a smart card by loading the plurality of data into a memory of the smart card and applying each indicium 1516 to a surface of the smart card. The method also comprises loading the smart card into a smart card reader 1604 and selecting 1608 any one of the indicia. The method then activates the service by communicating 1614 the selected data to the electrical apparatus.

42 Claims, 18 Drawing Sheets

U.S. PATENT DOCUMENTS

| | | | |
|---|---|---|---|
| 5,883,370 A | | 3/1999 | Walker et al. ............... 235/375 |
| 5,886,691 A | * | 3/1999 | Furuya et al. .............. 345/721 |
| 5,907,350 A | * | 5/1999 | Nemirofsky ................. 725/23 |
| 5,911,031 A | | 6/1999 | Lee ............................. 386/77 |
| 5,949,492 A | | 9/1999 | Mankovitz ................. 348/473 |
| 5,973,475 A | | 10/1999 | Combaluzier .............. 320/107 |
| 5,990,890 A | * | 11/1999 | Etheredge ................... 345/808 |
| 6,014,593 A | | 1/2000 | Grufman .................... 700/136 |
| 6,032,085 A | | 2/2000 | Laurent et al. ............. 700/242 |
| 6,035,037 A | * | 3/2000 | Chaney ...................... 380/227 |
| 6,039,251 A | * | 3/2000 | Holowko et al. ........... 235/380 |
| 6,229,694 B1 | | 5/2001 | Kono ......................... 361/683 |
| 6,330,021 B1 | * | 12/2001 | Devaux ..................... 348/14.04 |
| 6,424,947 B1 | * | 7/2002 | Tsuria et al. .................... 705/1 |
| 2001/0003041 A1 | | 6/2001 | Redford et al. ............. 434/307 |
| 2001/0017616 A1 | | 8/2001 | Kobayashi .................. 345/173 |

* cited by examiner

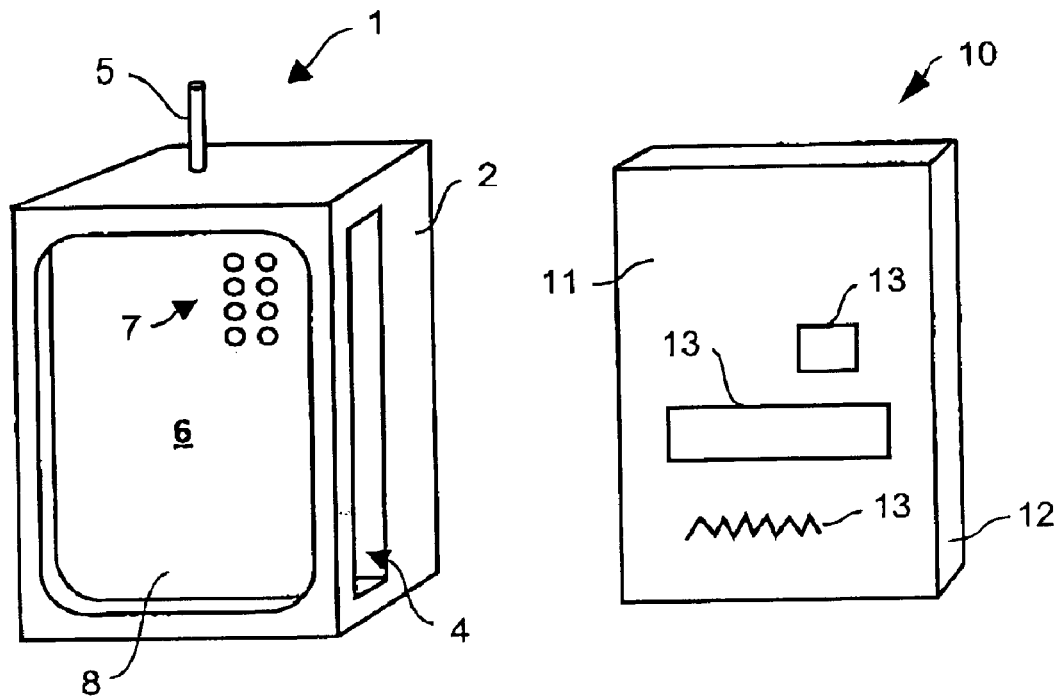
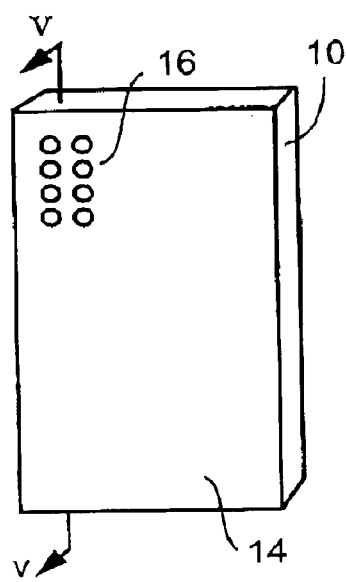
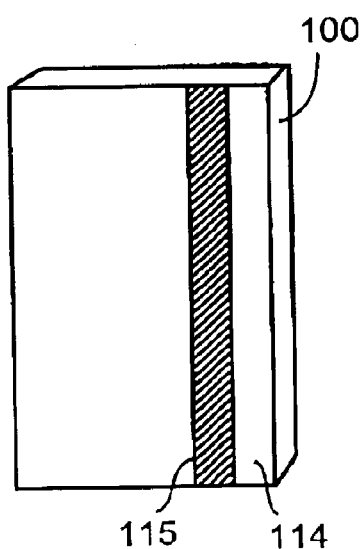
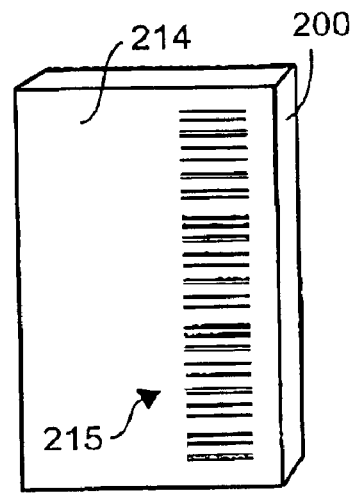
Fig. 1
Fig. 2   Fig. 3   Fig. 4

US 6,877,655 B1

PROVIDING SERVICES UTILIZING A SMART CARD

TECHNICAL FIELD OF THE INVENTION

The present invention relates generally to providing services utilising a smart card and, in particular, to entertainment selection, prescribing and dispensing drugs, self education via tutorials, payment to the copyright owner for the right to use the source material. The present invention also relates to a smart card for providing services and to a method and system for providing services.

BACKGROUND ART

The provision of services to a user or users may at times be inflexible, and time consuming, both from the point of view of the user or users and the service providers. For example, the following activities: entertainment selection, prescribing and dispensing drugs, self education via tutorials payment to the copyright owner for the right to use the source material, all involve disadvantages, which now will discussed.

Watching television, home videos, and like sources of entertainment is an everyday activity for all households. Various sources of entertainment are available including television and other broadcast or network mass media, including cable television. Entertainment programme guides are available in print form, for example in newspapers and periodicals. Entertainment programme guides are also available in electronic form via the Internet or world wide web. The electronic form of programme guides are particularly suitable for coupling to home entertainment appliances so that a programme can be automatically selected for reception and perhaps recorded for the purposes of time shifting. It is also possible to apply selection criteria to create a personalised guide customised for an individual preference so that, for example, all episodes of a particular TV mini series are able to be recorded.

These prior art methods of selecting programmes suffer, however, from the disadvantage that there is no tangible object corresponding to a guide selection which the user can use as an interface to activate programmes. Instead the information exists in electronic form within the user's appliance or in the service provider's database(s). As the number of channels providing content, and the content on each channel, increases, the amount of corresponding information becomes larger and larger. This makes it more difficult for the user to easily retrieve a particular piece of customised programming.

Additionally, as there is no tangible object corresponding to the stored programming, it is not possible to take advantage of well developed marketing techniques for product promotion using programming. For example, it is difficult for a media company to draw the attention of viewers to a particular programme (eg a special feature) and at the same time promote associated products via advertising. In the case where the programming information is stored in electronic form inside the user's appliance, no opportunity exists for the advertiser to provide information to allow the user to easily link from the programme to associated promotions.

A further disadvantage of electronic programme guides is that there is no facility to allow the user to be identified. Consequently, there is no provision for restricting minors, for example, to a particular type or category of programme. Such a feature is particularly desired in many households where parental control over the viewing habits of children is a desired outcome.

Ill health is an occasional occurrence for most persons and this generally involves a visit to a medical practitioner who determines the nature of the ailment and writes a prescription for a drug. The patient then takes the prescription to chemist who actually dispenses the drug. The drug is then swallowed, rubbed on, or otherwise administered to the patient in accordance with some instructions determined by the medical practitioner and/or the drug manufacturer. Generally this results in the ailment being cured.

In different countries, different terms are used for the participants in this process. The term "medical practitioner" will be used herein to include doctors and physicians. The term "chemist" will be used herein to include pharmacists, druggists and apothecaries. The term "chemist shop" will be used herein to include drug stores and pharmacies. The term "prescription" will be used herein to include scripts. The term "drug" will be used herein to include medicines and pharmaceuticals.

The abovementioned manual system suffers from several disadvantages. One is that because the information is in written form it requires manual transcription. This can be manual transcription from a work of reference in the medical practitioner's surgery onto the prescription written by the medical practitioner. In addition, manual transcription also occurs in the chemist shop where the chemist is obliged to transfer the information onto the packaging of the drug. Often this takes the form of an adhesive label which covers over other valuable information on the drug packaging. Sometimes the chemist prints out general notes for the patient which requires additional effort on the chemist's part and the notes may well get separated from the drug itself.

Furthermore, the abovementioned scheme to some extent inadvertently reduces the patient's access to information. Although the patient can read the prescription, the patient is not normally accustomed to the abbreviations and notations used by medical practitioners in communicating with chemists. In addition, the handwriting of medical practitioners is notoriously hard to decipher. Whilst most chemists are used to reading the handwriting of medical practitioners in their area, the patients of the medial practitioners are not used to reading this handwriting.

A further disadvantage is that the prescription in written form is not amenable to electronic commerce. As the information on the prescription is not in machine readable form, the purchase of the drug by means of an on-line chemist service is inhibited. In particular, this would require manual transcription of the information on the prescription into electronic form for transmission to such an on-line pharmacy. Since such transcription errors could be life threatening, if the incorrect dosage, for example, is specified as a result of a typographical error, such on-line electronic commerce is inhibited.

Furthermore, various government regulations apply to the dispensing of drugs, often because there is a government subsidy involved in the cost of the drug to the patient. For example, the patient or his agent is required to sign a receipt for the drug. In addition, prescriptions often require repeats, checks for the expiry date of the prescription, and similar requirements. Having this data in machine readable form would allow these tasks to be delegated to a computer.

U.S. Pat. No. 5,883,370 discloses the user of bar codes generated by a medical practitioner to identify a prescribed drug and for the chemist to read the prescribed bar code and the bar code on the label of the drug to be dispensed with a bar code reader located in the chemist shop. The drug is only dispensed if there is a match between the two bar codes. The purpose of the disclosure of U.S. Pat. No. 5,883,370 is to prevent the possible mis-dispensing or erroneous dispensing of drugs.

U.S. Pat. No. 4,766,542 discloses the use by a chemist of a computer and automatic telephone dialler to telephone the patient when a refill or repeat prescription is due. The purpose of the disclosure of U.S. Pat. No. 4,766,542 is to increase correct drug taking compliance and increase the sale of refill or repeat prescriptions at chemist shops utilising the computerised dial up system.

Learning is an everyday activity for all households and a wide variety of educational classes, methods of instruction, and so on, are known. For example, cooking tutorials are available in printed form and also in the form of video cassettes or video discs. With the assistance of these devices, a cook can increase his or her knowledge of the preparation or presentation of particular types of foods.

However, this printed form of instructional material suffers from the disadvantage that the materials is not annotated, or indexed, with video material that would be of advantage in the learning process. Instead, these forms of presentation of information are relatively inflexible in that printed materials, videos, etc are normally produced in large runs and consequently are not easily adapted to local situations. For example, in certain seasons or in certain locations various ingredients are often unavailable and therefore substitutes should be recommended.

In particular, the video cassette suffers from the disadvantage that the material cannot be readily viewed in a non-linear fashion as the tape is not amenable to random access. Although the video disc form can be accessed in a non-linear fashion, the means for allowing the user to navigate through the various sections into which the disc is divided, generally take the form of structured menus. These menus, together with the limited functionality of user interfaces generally available on video disc players, results in a less than desirable user experience. This is especially important wherein the information is required urgently.

Other disadvantages of the tutorial material, irrespective of its form of presentation, is that it does not provide assistance such as automatic calculation of the volume of ingredients needed for different numbers of serves or measurements of, say, woodworking projects of differing sizes. Particularly where prime numbers such as 5 and 7 or 13 are involved, the arithmetic involved in adjusting the volumes, weights, dimensions, etc is not necessarily straightforward. Also there is generally no advice provided as to where or how the ingredients or raw materials can be purchased.

Various methods of compiling a document, collage, multimedia video clip, and the like from various different sources of content are well known. This can be done by manual editing, for example, or by electronic means that create a virtual document with references to the individual source items. A well known standard used on the World Wide Web is Synchronised Multi-media Integration Language (SMIL) which creates a document containing embedded links to other documents. For example, a document A may contain a link to a first video clip B and also to a second video clip C with the document being arranged so that the video clips B and C are played sequentially.

One problem which arises when such compilations of works from multiple sources are made is that of determining what the applicable charges are for the use of the source of material. For example, each component of the compilation may have a different rate of charging. In the example given above, the video clip B may cost one cent per second and the video clip C may cost five cents per second. These differences may be due to different ownership, market demand, and other relevant factors. Also the charge may depend on the quality of the presentation that is requested. For example, it may cost twice as much to display a high resolution television image than to display a standard resolution television image. Furthermore, differences in rates may apply to different usages. A compilation that is intended to be shown to a paying audience in an auditorium would normally be charged at a higher rate than for one which is intended to be viewed in a private home.

Because of all these factors, the creator of the compilation has a cumbersome task of finding out the appropriate payment to be made to the various copyright owners in order to legally create and reproduce the compilation. A further complication is that different legal entities represent different copyright owners and thus more than one collection agency may be involved. All these factors lead to the creator of the compilation spending significant amounts of time and effort in what is essentially a non-creative and burdensome task.

SUMMARY OF THE INVENTION

It is an object of the present invention to substantially overcome, or at least ameliorate, one or more of the above disadvantages of the prior art.

According to one aspect of the present invention, there is provided a method of providing services using a smart card, wherein said services comprise the steps of: generating a plurality of data, wherein each said data comprises information for activating a service associated with an electrical apparatus; generating an indicium associated with each said data; programming a smart card by loading said plurality of data into a memory of said smart card; applying each said indicium to a surface of a smart card; loading the smart card into a smart card reader; selecting any one of said indicia; and activating said service associated with said selected indicium.

According to another aspect of the present invention, there is provided a method of providing a first service from amongst competing services, said method comprising the steps of: storing in each of a plurality of like smart cards a plurality of enhancement activities as an adjunct to said first service, each of said activities being stored at a corresponding one of a plurality of stored data each associated with a corresponding one of a plurality of indicia, distributing a multiplicity of smart cards each to a prospective user of said first service, and during said first service requesting all users with said smart cards to enter same in a smart card reader and by selecting one of said indicia, partake of the corresponding enhancement activity.

According to another aspect of the present invention, there is provided a system for providing services using at least one programmable smart card, said system comprising: at least one programmable smart card comprising an electronic memory; means for generating a plurality of data, wherein each said data comprises information for activating a service associated with an electrical apparatus; means for generating a plurality of indicia associated with said plurality of data; a smart card programmer means for storing said plurality of data in said electronic memory; means for applying said indicia to a surface of said smart card; a smart card reader comprising a bay to receive said smart card and communications means to communicate with said electrical apparatus for activating said service associated with a selected said indicium.

According to another aspect of the present invention, there is provided a smart card for use in providing services, said smart card comprising an electronic memory, a plurality of indicia on a surface thereof, a like plurality of stored data each associated with a corresponding one of said indicia, being located in said memory, and being outputtable therefrom, wherein each said data is adapted to active a service associated with an electrical apparatus.

BRIEF DESCRIPTION OF THE DRAWINGS

Embodiments of the present invention will now be described with reference to the drawings, in which:

FIG. 1 is a perspective view of a smart card and a smart card reader;

FIGS. 2 to 4 are each views of the reverse side of smart cards of different embodiments;

DETAILED DESCRIPTION INCLUDING BEST MODE

Figure 5:
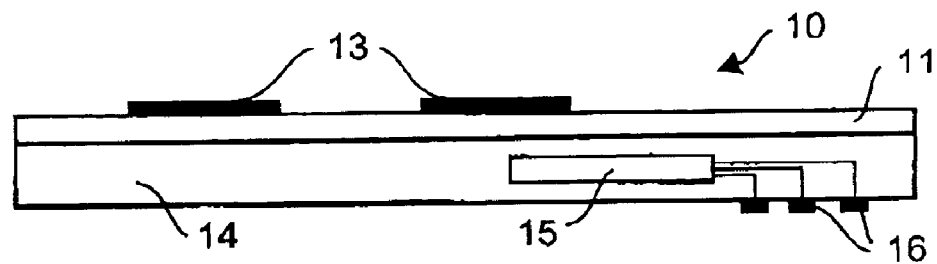
FIG. 5 is a longitudinal cross-sectional view through the line V—V of FIG. 2.

In FIG. 1, there is illustrated a smart card reader 1 having a housing 2 in which is formed a bay 4 and a viewing area 6. Data reading means are provided in the form of exposed reader contacts 7 and associated control circuitry (not illustrated). The smart card reader 1 also includes key means in the form of a substantially transparent pressure sensitive membrane 8, which covers the viewing area 6. The smart card reader 1 is configured for use with a smart card 10 which has a planar, preferably laminar, substrate 12 with a plurality of indicia 13 on its front face. As best seen in FIG. 5 the indicia 13 can be applied by printing, by adhering, or any other conventional process. As also seen in FIG. 5, the smart card 1 includes an electronic memory in the form of an on-board memory chip 15 which is connected with card contacts 16 which cooperate with the reader contacts 7.

In use, the smart card 10 is inserted into the bay 4 with its front face 11 facing towards the pressure sensitive membrane 8. As a consequence the pressure sensitive membrane 8 covers the front face 11 but the control indicia 13 are visible within the viewing area 6 because the pressure sensitive membrane 8 is transparent.

The reader contacts 7 and associated circuitry are configured to read mapping data associated with the control indicia 13 and stored in the memory chip 15. This reading can take place either automatically upon insertion of the smart card 10 into the bay 4 or selectively in response to a signal from the smart card reader 1. This signal can, for example, be transmitted to the smart card reader 1 via the exposed reader contacts 7 and card contacts 16.

Once the mapping data associated with the indicia 13 has been read, a user can press areas of the pressure sensitive membrane 8 overlying or immediately adjacent to the underlying indicia 13. By sensing the pressure on the pressure sensitive membrane 8, and referring to the mapping data, the smart card reader 1 can deduce which of the indicia 13 the user has pressed. In this way, although the indicia 13 have no mechanical or electrical function, when placed under the transparent pressure sensitive membrane 8, the indicia effectively become keys operable by the user and this function of the key is determined by the mapping data.

In its preferred form, the smart card reader 1 includes a transceiver, which utilises an aerial 5 for transmitting and receiving radio frequencies. The transceiver circuit is not illustrated but is of conventional form but it will be understood by those skilled in the art that an infrared transmitter or other forms of data transmission, including hard wiring, can be used.

Upon selection of one of the indicia 13, the smart card reader 1 causes information related to the selection to be transmitted via the aerial 5 to a visual display unit 20 (FIG. 6) which includes a corresponding aerial 25 and associated transceiver. Thus in the preferred form, information can be transmitted between the visual display unit 20 and the smart card reader 1 in both directions and can include, for example, hand shaking data, set up information, or any other form of information desired to be transferred between the two devices.

Turning now to FIG. 3, there is shown an alternative embodiment 100 to the smart card 10 of FIGS. 1 and 2. In the smart card 100 indicia 13 are (as before) provided on the front face (not illustrated in FIG. 3). However the memory storage for the smart card 100 takes the form of a magnetic strip 115 formed along the rear face 114 of the smart card 100. The mapping data and any other information which is stored in the magnetic strip 115 is stored in conventional manner. The smart card reader (not illustrated) to cooperate with the smart card 100 includes a magnetic read head positioned at, or adjacent, the corresponding bay of the reader. As the control card 100 is inserted into the bay the mapping data is automatically read from the magnetic strip 115 by the magnetic read head. In all other respects the magnetic card reader for the smart card 100 is then operated as described in relation to the embodiment of FIG. 1.

FIG. 4 shows another embodiment of a smart card 200 in which the storage means takes the form of a machine readable bar code 215 printed on the rear face 214 of the smart card 200. The mapping data, etc is encoded within the bar code. The corresponding smart card reader (not illustrated) for the smart card 200 includes an optical read head positioned at, or adjacent, the entrance to the reader bay. As the smart card 200 is slid into the bay, the mapping data, etc are automatically read from the bar code 215 by the optical read head. Alternatively, the bar code can be scanned using a bar code reader associated with the smart card reader immediately prior to inserting the smart card, or can even be scanned by an internal bar code reader scanner once the smart card 200 has been completely inserted into the smart card reader.

Figure 6:
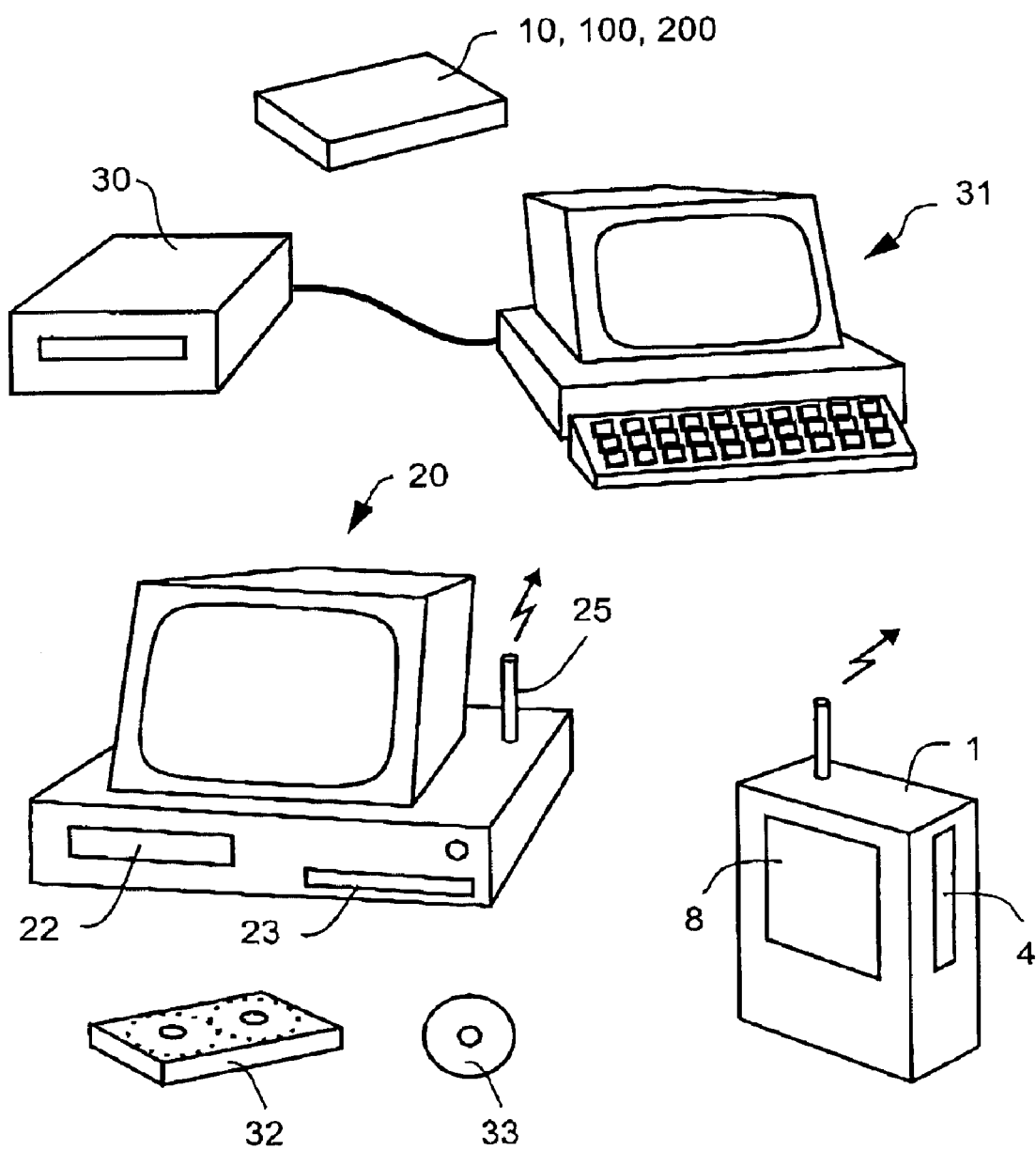
FIG. 6 is a schematic perspective view of all the items of equipment, which go to make up the system for providing services.

Turning now to FIG. 6, the other components of the overall system are illustrated. In addition to the smart card 10 (100 or 200) there is a smart card programmer 30 which is connected to, and controlled by, a personal computer (PC) 31. When the smart card 10, 100, 200 is inserted in the smart card programmer 30, data entered into the PC 31 can be used to programme the memory chip 15, magnetic strip 115 or bar code 215. The smart card programmer may also comprise a printer for printing on the surface thereof a plurality of indicia.

The foregoing describes only some embodiments of the smart card, and variations and modifications are possible without departing from the spirit and the scope of the present invention. For example, rather than a pressure sensitive pad located over the smart card 10, the smart card reader 1 can be modified so as to have capacitive sensors located underneath the bay 4 into which the smart card 10 is placed. In this arrangement, touching the front face 11 of the smart card 10 would result in the capacitive sensors located opposite the point of contact of the finger being changed or discharged due to the capacitance of the user. In this way the indicium at the corresponding location can be indicated. Further, whereas the above embodiments generally refer to smart cards having electrical contacts, smart cards that operate without electrical contacts, for example utilising electro-magnetic radiation for proximity reading of the stored data, may alternatively be used.

Figure 15A:
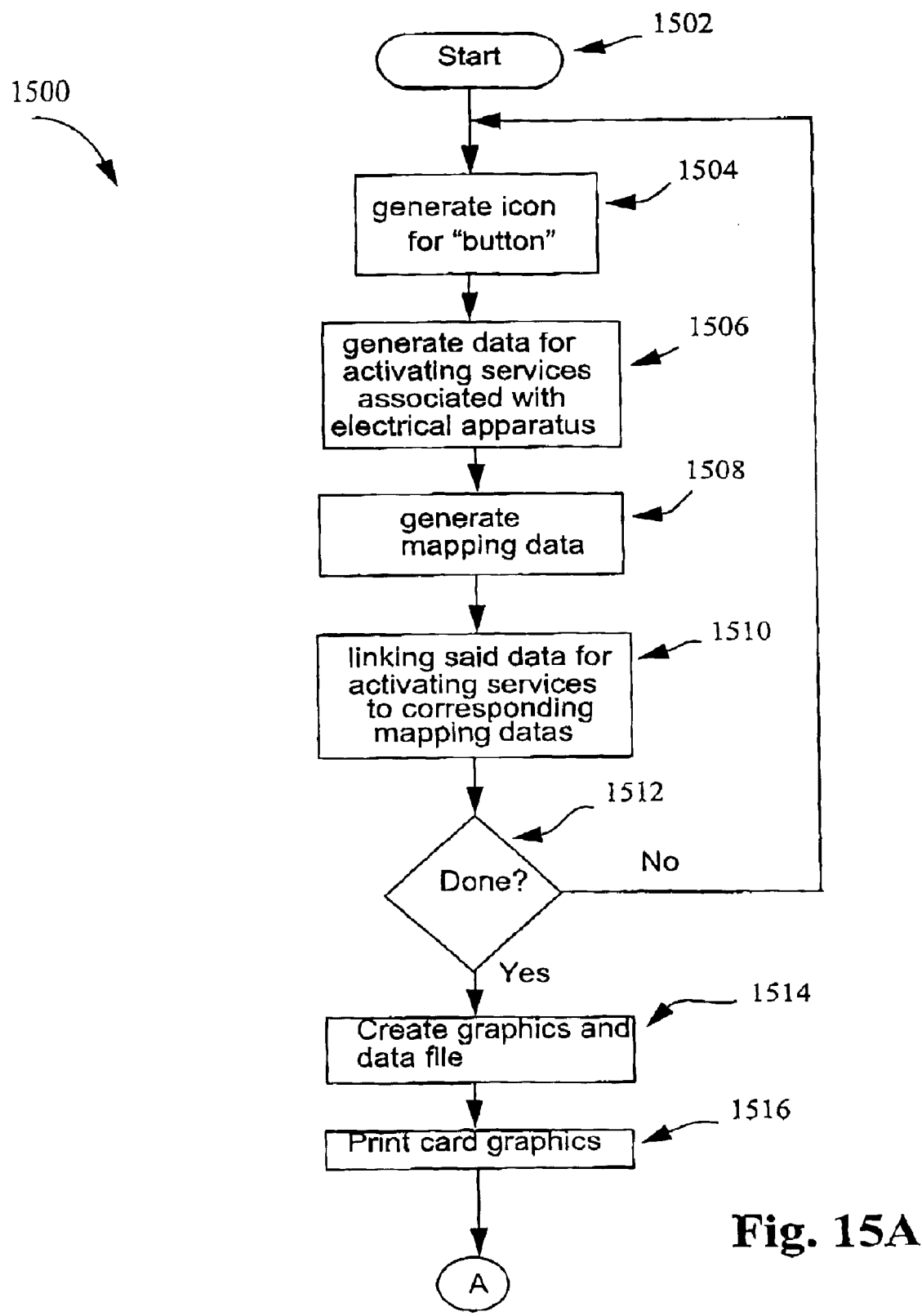
FIGS. 15A and 15B is a flow chart showing a method of customising a smart card for use in providing services.
Figure 15B:
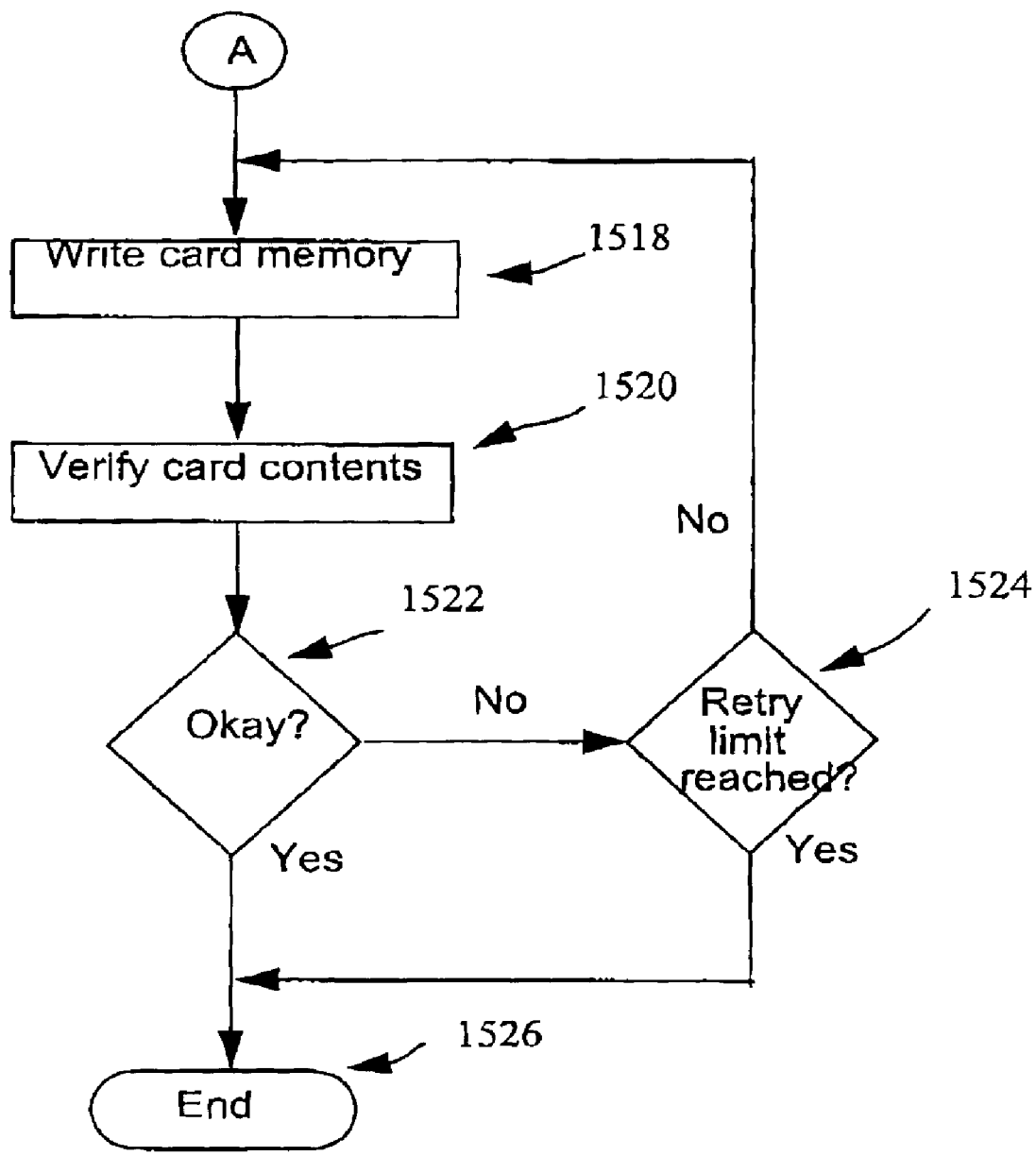

Turning now to FIGS. 15A and 15B, there is shown a method of customising a smart card for use in providing services. The programmable smart card 10 (100 or 200) is supplied in an original manufactured form, for example from an original equipment manufacturer (OEM), typically to a third party for programming the smart card 10 (100 or 200). That third party can customise the programmable smart card in accordance with the method shown in FIGS. 15A and 15B. Alternatively, such customisation may be performed by the OEM by programming the manufactured smart card according to a specific user requirement. The method 1500 commences at step 1502 where any necessary parameters are initialised. The method then proceeds to step 1504, where the programmer generates an icon for a "button" to be applied to the smart card 10 (100 or 200). The icon may be generated in any known manner on the personal computer 31 and can include a pre-generated icon. The icon or "button" is to be associated with a service to be provided in association with an electrical apparatus, such as a video display unit 20. The method 1500 then proceeds to step 1506, where the programmer generates data for activating a service associated with the electrical apparatus. Such a service may include the control of the electrical apparatus, per se. It can also include a service, which is performed in conjunction with the electrical apparatus. For example, the electrical apparatus can comprise a personal computer and the service may relate to the dispensing and prescribing of drugs. Namely, the data can include information defining a drug prescribed for said patient and may also include a pointer to a site on the Internet for further information on the drug for display on the visual display device 20.

Once the smart card 10 (100 or 200) has been programmed, the method proceeds to step 1508, where the method generates mapping data (x,y coordinates) for the location where the icon is to be applied on the front surface of the smart card 10 (100 or 200). The smart card programmer then in the next step 1510 links the mapping data of the location of the icon ("button") with the data for activating the service. This linking is achieved by way of a table stored in the smart card memory. The table contains a concordance between the mapping data of all the buttons and the plurality of data associated with the respective services. The method then proceeds to a decision block 1512, where the method asks the programmer whether he/she wishes to add further icons and services to the smart card. In the event the programming has not been completed, the method returns to step 1504, for the addition of a further icon/service. Otherwise, the method proceeds to step 1514.

The method then creates 1514 a graphics file comprising an image consisting of a composite of the icons generated during step 1504. The icons are composited as an image utilising said mapping data. The icons are disposed within said image at those locations indicated by the corresponding mapping data. The smart card programmer contains a printer, which then prints 1516 the image on the smart card. In this way, the icons are printed on the front surface of the smart card at the locations designated by the mapping data. The method also creates 1514 a data file containing the information necessary for activating the desired services and the table containing the concordance between the mapping data of all the icons (buttons) and the plurality of data associated with the respective services. The method then proceeds to step 1518, where the data file is written to memory in the smart card 10 (or 100 or 200). The method then proceeds to step 1520, where the method reads the data file stored in the memory of the smart card and checks 1522 whether this data corresponds to the original data. If this data does not correspond, then the method returns to steps 1518 and 1520, where the data is once again written and read. If the data is still not okay, the method continues this process until either the read data corresponds to the original data or the decision block 1524 determines that a maximum number of write/reads have occurred. Otherwise, the method terminates 1526.

In this way, the smart card produced by the method has stored in its memory a list of x-y coordinates and commands associated with the "buttons", "icons", and/or "regions" of the smart card. For instance, each member of the list may have the syntax {TL,BR, "COMMAND"}, where TL and BR are the x-y coordinates of the top left hand corner and bottom right hand corner respectively of the associated "button", "icon" or "region" on the smart card, and where "COMMAND" is the associated command to be performed by pressing the associated "button", "icon", or "region". Some examples of "COMMAND" may be load URL address, or down load file etc. Preferably, the syntax allows multiple commands for each TL, BR coordinate. For instance, a member of the list may contain in addition to a command designated by the "button", a further command for retrieving and playing a particular sound sample for feedback to the user as previously described. Preferably, the syntax of "COMMAND" allows an object to be associated with the "COMMAND", which object may also be stored in the memory of the smart card. For example, the command "display file.txt" may refer to a service relating to the display of the data file "file.txt" on the visual display device 20.

Whilst the above example described the "button" regions as rectangles, other shaped regions may be used as required or desired. Arbitrary "button" regions may be defined by a predetermined coordinate scheme.

Figure 16A:
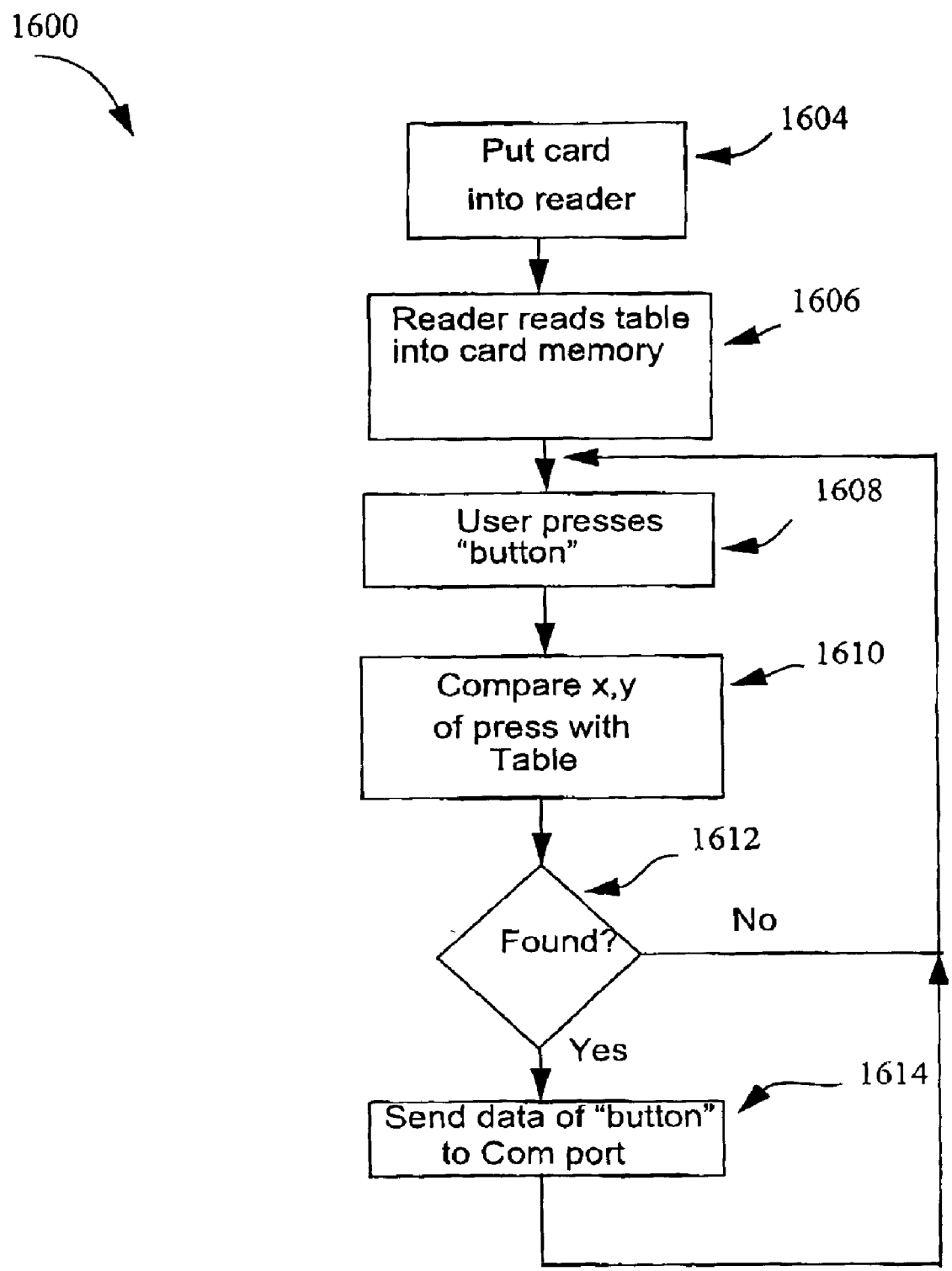
FIGS. 16A and 16B is a flow chart showing a method of using a smart card programmed in accordance with the method shown in FIGS. 15A and 15B.
Figure 16B:
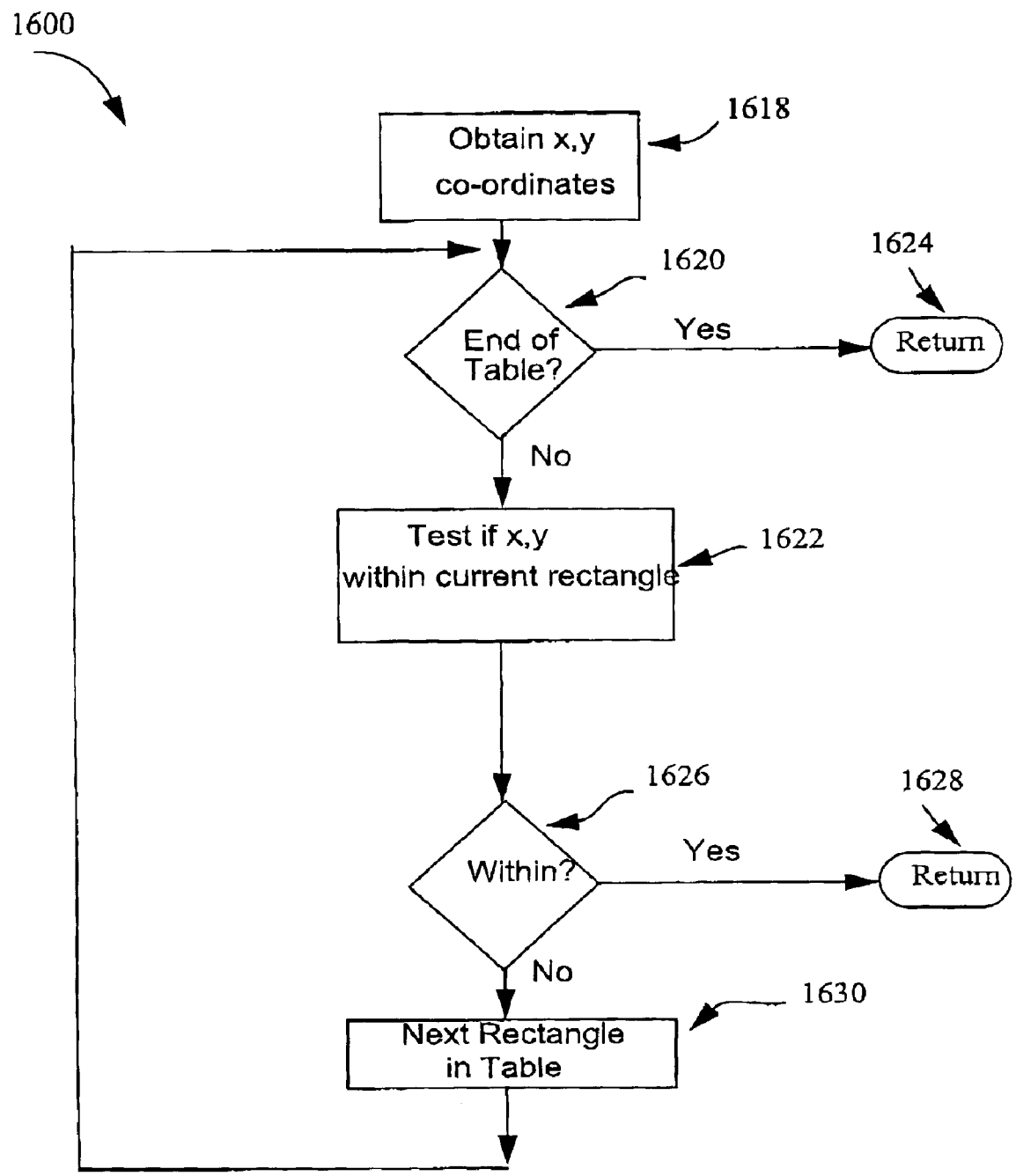

Turning now to FIGS. 16A and 16B, there is shown a flow chart of a method of using a smart card programmed in accordance with the method shown in FIGS. 15A and 15B. The method 1600 commences 1604 once the user puts the programmed smart card in the smart card reader 1. After commencement, the method then reads 1606 the data file stored in the memory of the smart card into memory of the smart card reader. At any time during this process, the user may press 1608 any "button" on the smart card designating the service the user wishes to be performed. The method determines the x, y coordinates of the user's press on the transparent membrane 8 of the smart card reader 1 under which the button is located. The method 1600 then compares the x,y coordinates of the user's press with the x,y coordinates of the table stored in the smart card reader, which was previously loaded during step 1606. The manner in which this is achieved is described in more detail with reference to FIG. 16B, which will be described below. The method then proceeds to decision block 1612, where a check is made whether the x,y coordinates of the user's press coincides with one of the x,y coordinates found in the table. If there is no coincidence (e.g. the user hasn't pressed anything), then the method returns to step 1608 for further processing. Otherwise, the method continues to step 1614, where the method identifies the data for activating the desired service corresponding to the x,y coordinates found in the table (which corresponds to the "button" pressed by the user). This data has preferably, been previously read from the smart card memory to the smart card reader memory upon insertion of the card into the reader. This data includes one or more commands and possibly associated information and which are sent to a communication port, where it is sent to an electrical apparatus for further processing. The electrical apparatus activates the commands, which for example may include the display of associated information. The method is terminated (not shown) once the user removes the smart card from the smart card reader.

Turning now to FIG. 16B, there is shown in more detail the step 1610 of comparing the x,y coordinates of the user's press and the x,y coordinates listed in the table stored in the memory of the smart card reader. The step 1618 first obtained the x,y coordinates of the transparent membrane of the smart card reader where the user has pressed. The method then proceeds to a loop 1620, 1622, 1626, and 1630 and loops through the x,y coordinates of each entry in the table for processing. If the end of the table has been reached without a corresponding x,y coordinates being found the method proceeds to step 1624, where the method returns that no corresponding x,y coordinates have been found. If the end of the table has not been reached, the method then proceeds to step 1622, where a comparison is made between the x,y coordinates of the user's press and the current rectangle corresponding to the current x,y coordinates stored in the table. If the x,y coordinates of the user's press is found to be within 1626 the current rectangle then the method returns 1628, the x,y coordinates of the current rectangle and its associated data. Namely the command data for performing the desired service indicated by the button pressed by the user. If, the method finds that the x,y coordinates of the user's press is not within the current rectangle then the method proceeds to the next rectangle listed in the table designated its x,y coordinates.

As will be explained hereafter with reference to FIG. 7, in another embodiment the smart card programmer 30, PC 31, smart card reader 1 and visual display 20 are all located at the home of the user and the smart card is programmed at home by the user. However, in accordance with a further embodiment as described with reference to FIG. 8, the smart card programmer 30 and PC 31 are normally located at the premises of a commercial enterprise such as a television station, advertising agency or the like which supplies commercially, perhaps by giving away to prospective viewers, the smart cards 10, 100, 200. The commercial enterprise is typically a service provider and obtains the smart cards from the manufacturer of the smart card. The commercial enterprise then programs the smart card for its own purposes.

Figure 7:
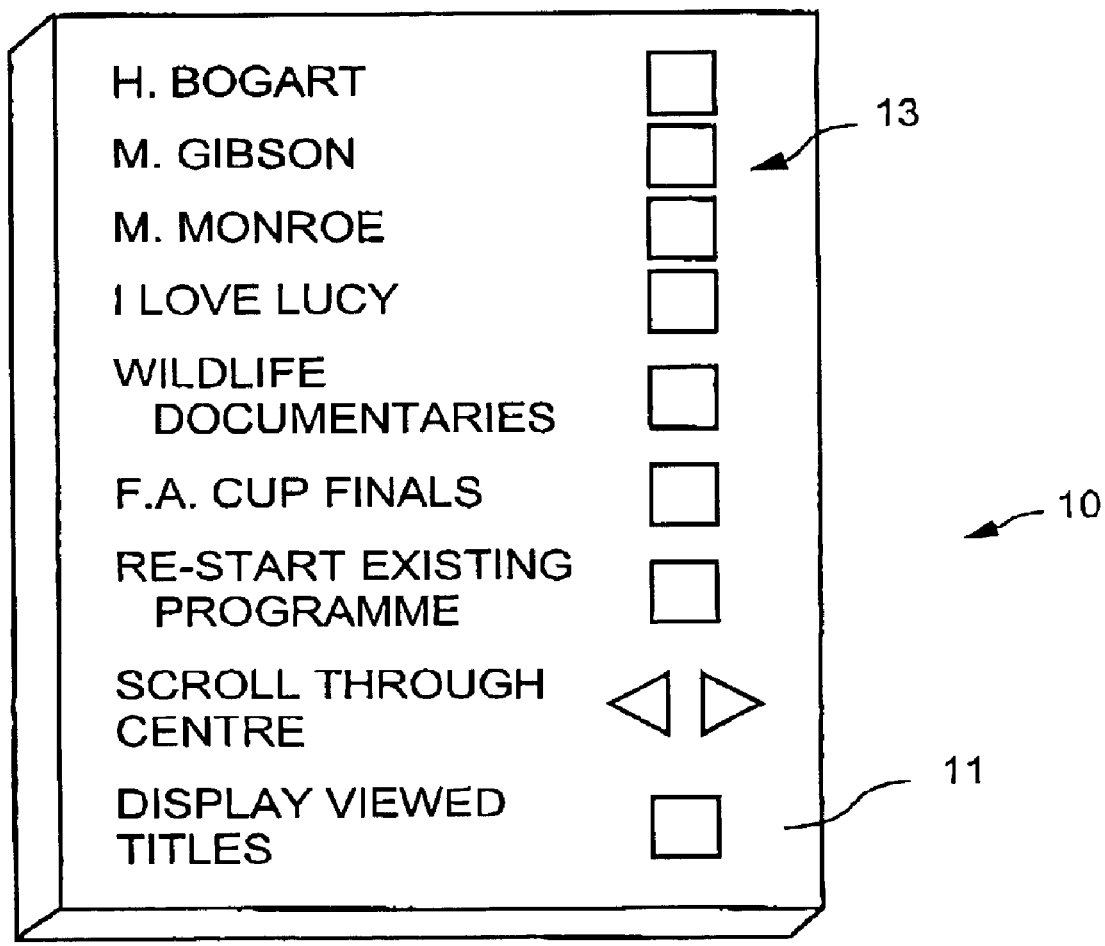
FIG. 7 is a plan view of the front of a smart card relating to a particular entertainment time period.

Turning now to FIG. 7, there is shown a smart card 10 (which is to be understood to also include the smart card 100 or 200) provided on its front face 11 with indicia 13 relating to particular types of programme (a programme genre). Such a smart card is prepared by the user inserting the smart card 10 in the smart card programmer 30 and contacting the electronic programme guides available on the World Wide Web via the PC 31.

By utilising the search facilities available in the PC 31, the user is able to select all available programmes within a predetermined time interval which consists of, for example, movies in which Humphrey Bogart acts, or movies in which Mel Gibson acts, or movies in which Marilyn Monroe acts, etc. In addition, all programmes available in the time period over all available channels of a particular type such as I Love Lucy, for example, or wildlife documentaries, or FA Cup finals are also able to be selected.

Since the smart card 10 is intended for home use, the indicia 13 indicating the nature of the various genre can simply be written in by hand on a paper cover which covers the front face 11 of the card 10. Alternatively, the PC 31 can be used in association with a conventional printer (not illustrated) to print a front cover sheet for the smart card 10.

After this activity has been undertaken, the smart card 10 is then able to be inserted into the smart card reader 1 and the visual display device 20 and its associated video cassette recorder operated so as to record the programmes on a video cassette 32 or video disc 33 over the time period.

Of course the user can, if he wishes, watch the desired programmes at the time of their "broadcast" and recording. However, in general time shifting is a desirable feature and therefore once the video cassette 32 or video disc 33 has been recorded, the user is then able to watch these recorded programmes at a time of the user's convenience. By inserting the video cassette 32 or video disc 33 into the visual display unit 20, and inserting the smart card 10 into the smart card reader 1, the user can select the indicia 13 corresponding to a particular genre, for example Mel Gibson movies, and this causes the visual display unit 20 to display the available possibilities recorded on the video cassette 32 or video disc 33.

The functionality of the smart card 10 is not limited to merely provision of a menu, or bookmarking function. As indicated in FIG. 7, by pressing the appropriate indicium 13, an existing programme can be re-started, a scrolling through all the available titles in a particular genre can be achieved, or the titles already viewed can be displayed or indicated from amongst all the titles so that the memory of the smart card as to the user's past activities enables the user to make a more informed choice.

Furthermore, every member of the family can be provided with a corresponding smart card 10 so that over a period of time a selection of programmes is built up which it is to the particular liking of each member of the household. In this way parental control is able to be exercised by control over the physical possession of the smart card 10. As a further precaution, an access PIN or other conventional data security device can be used to further exercise parental control.

Figure 8:
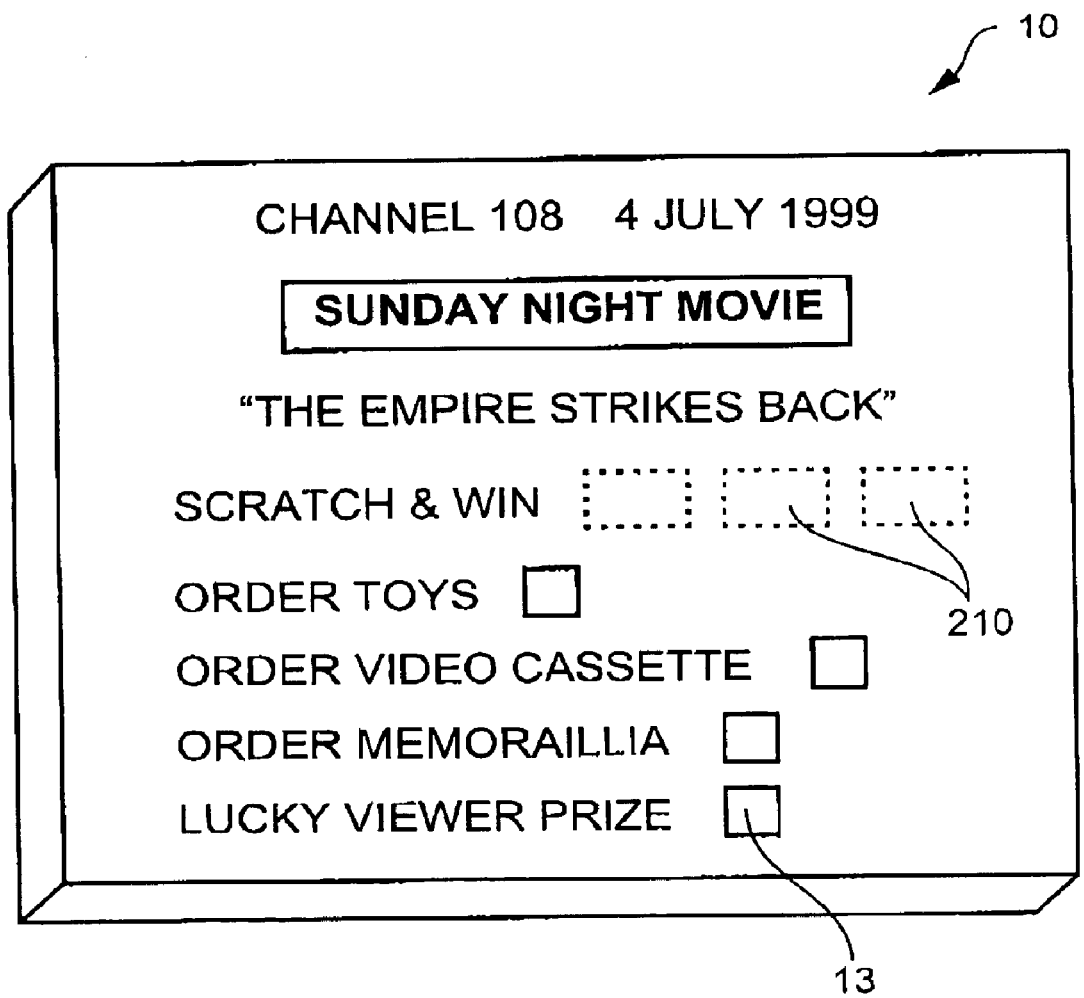
FIG. 8 is a front perspective view of a smart card associated with the advertising of a particular event.

Turning now to FIG. 8, another embodiment of a smart card 10 is illustrated, however, in this instance the smart card 10 is provided by a particular supplier to advertise a particular event. In the particular example given, the supplier is the operator of Channel 108 and the cards 10 are supplied gratis to households, for example via the postal authority's mail, in the week preceding the data of broadcast of the special event. The commercial purpose of the card is to increase the viewing audience for the particular event by providing various attractions. One attraction can be a conventional "scratch and win" lottery where conventional erasable panels 210 are placed over printed numbers or other symbols. Prizes are announced during commercial breaks in the movie and viewers are required to immediately telephone and claim the prize within some short predetermined period. Similarly, a lucky viewer prize indicium 13 can be provided which enables the smart card 10 when located within the smart card reader 1 to match with a data signal transmitted, for example, on the "back porch" of the television signal and thus not visible to a viewer not provided with a smart card 10.

Furthermore, since the visual display unit 20 can be connected via the Internet, telephone or fax modem, or any other modern communication mechanism to a home delivery and sales service, it is possible for a number of commercial supply activities to take place during the broadcast of the movie. For example, toys, video cassettes, memorabilia, etc can all be ordered, paid for via an account or credit card facility, and delivered to the home of the user. In the course of this activity the visual display unit 20 can display the prices, ordering information and so on.

Figure 17:
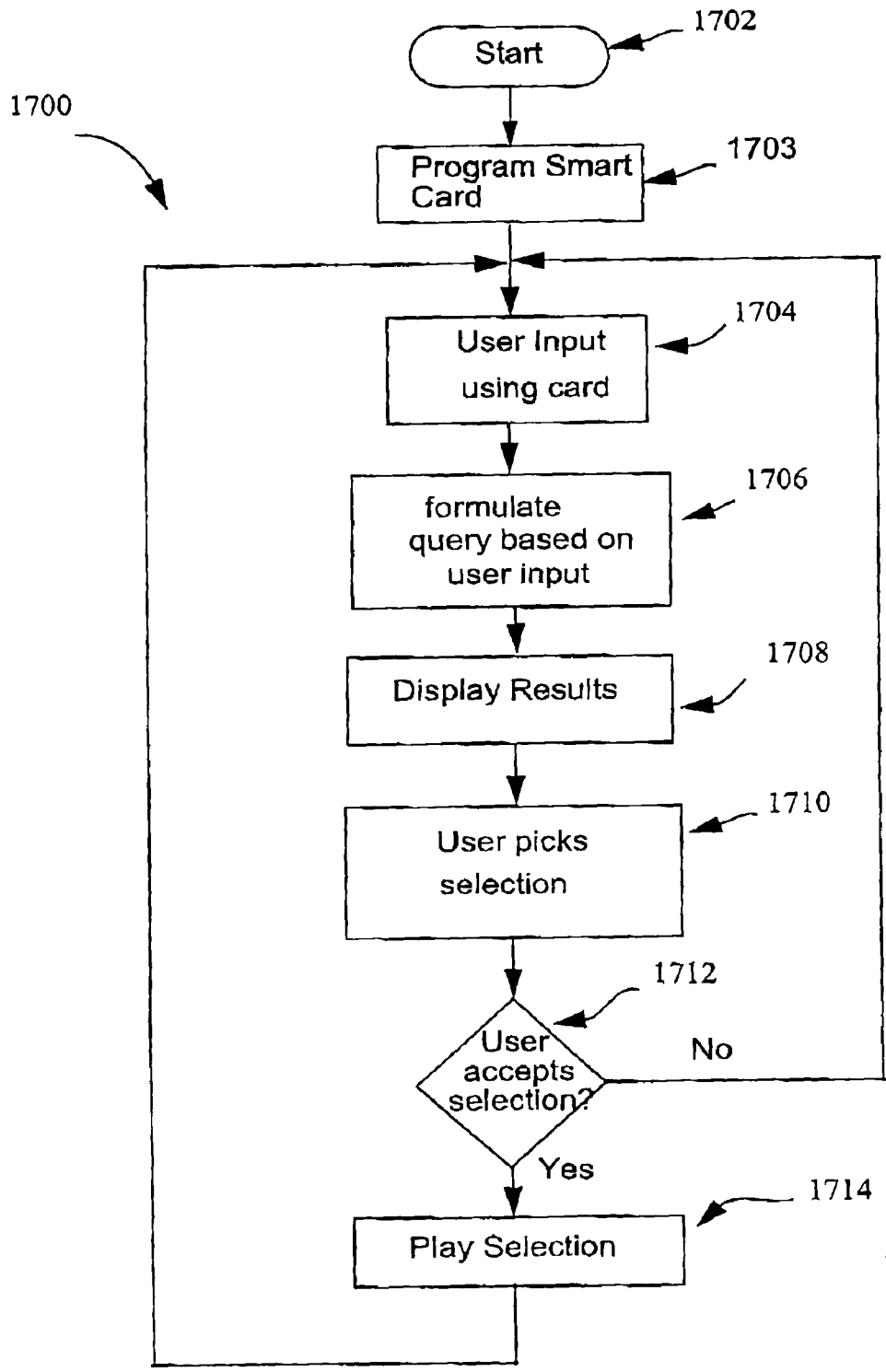
FIG. 17 is a flow chart showing a method of entertainment selection.

Turning now to FIG. 17, there is shown a method of entertainment selection in accordance with another embodiment. The method commences at step 1702, where any necessary parameters are initialised. The method then proceeds to step 1703, where the third party or end user programmes the smart card 10. During this step 1703, the third party or end user selects a number of available programmes, which are to be broadcast. Preferably, the user groups together programmes having certain characteristics. The user also inputs data relating to these programmes, such as title, time and channel information and the service to be performed by the electrical apparatus (e.g. TV/VCR). The services can include, the display of the list of the programmes, SQL commands, the broadcasting of a programme, the recording of a programming etc. This data and the associated mapping data of the corresponding indicia are then loaded into the table stored in the memory of the smart card as described previously. The indicia are printed on the card in the manner as described previously. In this particular embodiment, one or more "buttons" on the smart card refers to a number of programmes. In this case, the data entered on the smart card can include the Command: Display "file", which causes the visual display device 20 to display the list of programmes relating to that button. The list being stored in the file named "file". Other buttons may enable a SQL query to be formulated utilising these lists. For example, the user may select a combination of buttons thus formulating a SQL query of the programmes desired. The smart card may have a number of buttons for formulating such a query, eg "AND", "OR", and "ENTER" (to complete the query). Another "button" on the smart card may enable the user to select one of the displayed programmes for broadcast or recording. After the smart card has been programmed, the method proceeds to step 1704.

During step 1704, the user selects any one of the indicia on the smart card corresponding to the desired service he/she wishes to be activated. Typically, the user will select a list of programmes relating to a characteristic of those programmes. For example, the user may select F.A. Cup Finals (see FIG. 7). Upon selection, the method then formulates 1706 a query based on the user's selections and displays 1708 the list on the visual display device 20. For example, the visual display device 20 formulates the query and displays a list of all F.A. Cup Finals that are available for broadcasting/recording. This list is stored in the memory of the smart card 10. The method then proceeds to step 1710, where a user selects the desired final he/she wishes to see/record. If the user agrees to the selection 1712, then the method then proceeds to the playing or recording 1714 of the selection. If the user does not accept the selection the method returns to step 1704.

As will be explained hereafter in another embodiment described with reference to FIG. 9, the smart card programmer 30 and PC 31 are normally located at the premises of medical practitioner which supplies commercially, or perhaps gives away via drug company sponsorship, the smart cards 10, 100, 200. However, in another embodiment described with reference to FIG. 10, there are two sets of the smart card reader 1 and visual display unit 20. One set is located at the chemist's shop and the other set at the home of the patient. The patient preferably also has a video cassette 32 or video disc 33 which are respectively insertable into the VCR slot 22 and the CD drive 23 of the visual display unit 20.

Figure 9:
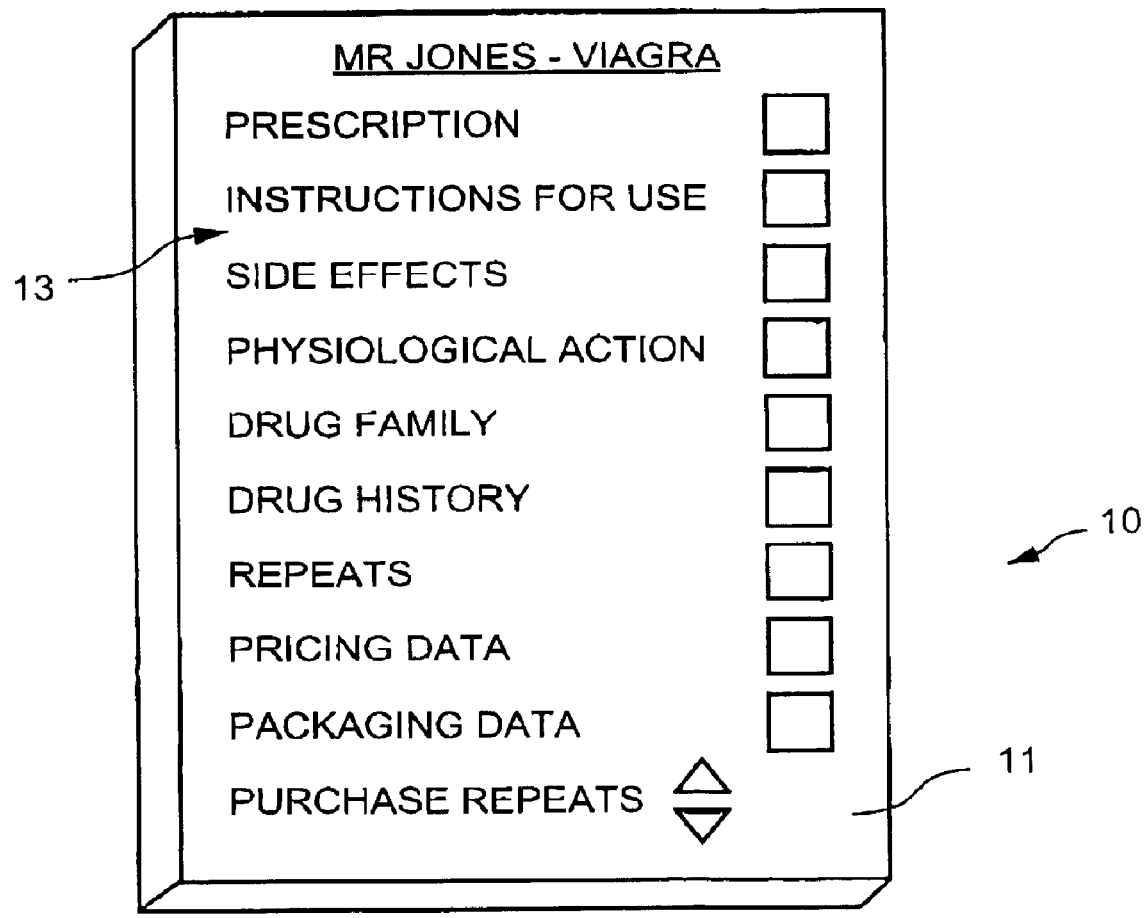
FIG. 9 is a plan view of the front of a smart card relating to a particular drug.

Turning now to FIG. 9, there is shown a smart card 10 (which is understood to also include the smart card 100 or 200) which is intended to be customised by the medical practitioner for a specific patient. In this embodiment the patient's name is Mr. Jones and the drug which the medical practitioner intends to prescribe for Mr Jones is VIAGRA (Registered Trade Mark). The medical practitioner does this by placing the smart card 10 into the smart card programmer 30 which is connected to the PC 31. The medical practitioner then enters via the keyboard of the PC 31 the name or patient number of the patient Mr Jones and the name or reference number of the drug known by the trade mark VIAGRA. In addition, the medical practitioner enters into the PC 31 the desired dosage rate, frequency of dosing, etc which constitute the instructions for use. Further, any information regarding repeats such as the number of repeats able to be ordered on the single prescription is also entered. As a consequence, not only is this data entered into the smart card 10, but the indicia 13 are preferably printed on an adhesive label by a conventional printer (not illustrated) operated by the PC 31 and adhered to the front face 11 of the smart card 10.

The data typed into the PC 31 by the medical practitioner is combined with a monotonically increasing time stamp and the combination is "signed" by the medical practitioner with a cryptographic key that uniquely identifies the medical practitioner and authenticates the contents of the smart card 10 as a valid prescription. Tampering with any of the information will cause the verification to fail. This method of authenticating data including a non-recurring piece of data (the time stamp) with a public/private key pair is a technique well known to those skilled in the computing arts.

Also loaded into the smart card 10 from the permanent memory of the PC 31 is information, or a pointer to information, regarding the prescribed drug such as its side effects, its physiological action, the family to which the drug belongs, the history of the development of the drug, etc. This voluminous information is thereby able to be readily accessed by the patient as will be described hereafter. If there is insufficient memory space for this information in the smart card, a pointer (such as a web site address) to the information can be loaded instead.

The next step in the dispensing procedure is that the smart card is notionally taken to the chemist. This can be achieved in two ways. In the traditional manner the smart card can be physically taken to the premises of the chemist, or as will be described hereafter, electronic commerce can be used to dispense the drug.

In the dispensing method analogous to the existing conventional method, the patient takes the smart card 10 to the chemist shop. The chemist is equipped with a smart card reader 1 and a visual display unit 20. Thus the chemist is able to indicate the indicia 13 corresponding to "prescription" and thereby have displayed on the visual display unit 20 the text of the prescription prepared by the medical practitioner. This enables the drug to be dispensed by the chemist.

The patient is then able to return to his home and insert the smart card 10 into the smart card reader 1 located at the patient's home. Also located at the patient's home is a visual display unit 20 so that the patient may be manual indication of the various indicia 13 on the front face of the smart card 10 inform himself about the side effects of the drug, the drug history, etc. In addition, in this way a substantial volume of information is available to the patient. In this way the oral information conveyed to the patient by the medical practitioner is able to be reinforced. Especially in respect of elderly patients this is thought to be a substantial contribution to overcoming patient confusion.

Figure 10:
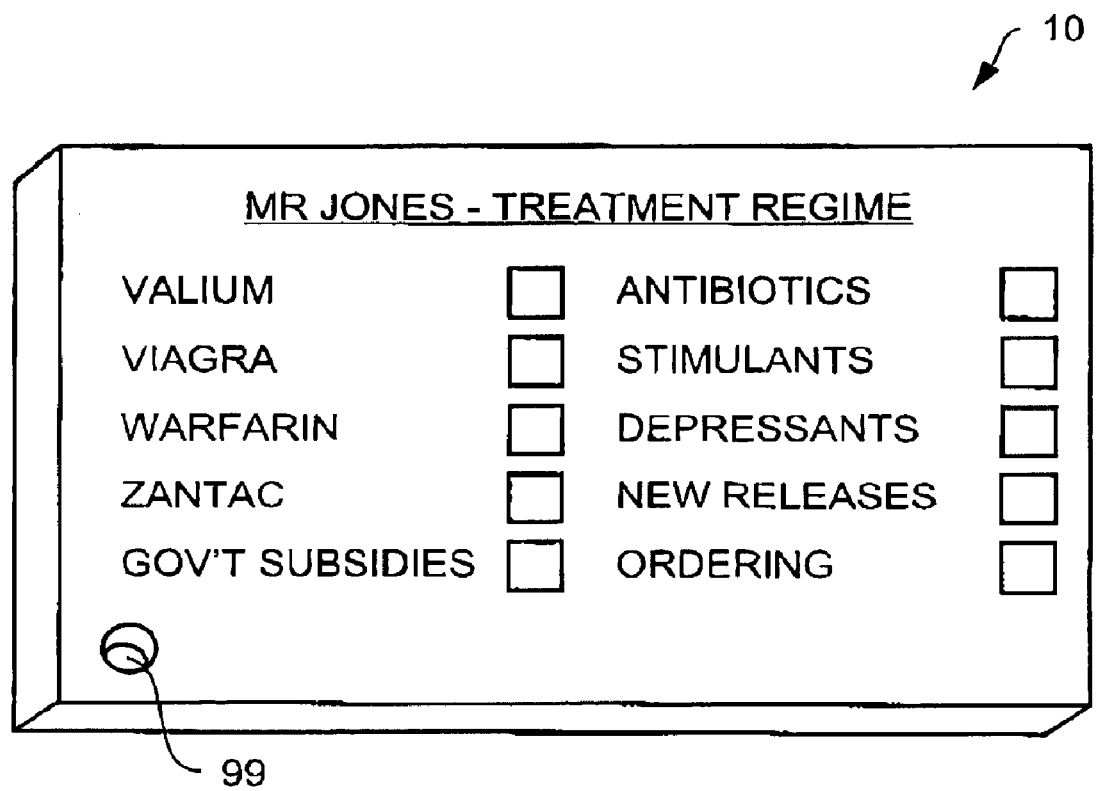
FIG. 10 is a front perspective view of a smart card relating to drugs manufactured by a particular drug company.

Turning now to FIG. 10, a further embodiment of the smart card 10 is illustrated but in this embodiment instead of the smart card 10 being associated with a particular drug, the smart card 10 in FIG. 10 is associated with all the drugs currently being taken by the patient Mr Jones. Thus, loaded onto the smart card 10 by the medical practitioner, as described above, is information relating to each of the drugs, VALIUM, VIAGRA, WORFARIN and ZANTAC (registered trade marks) which are current prescribed for Mr Jones together with general information about the consequences of taking antibiotics, stimulants, depressants, etc in combination with these drugs.

Rather than store large volumes of information within the smart card 10 itself, it is also possible to provide the patient with a video cassette 32 or video disc 33 which contains the data for a large number of drugs, possibly manufactured by a particular drug company who provides the cassette 32 or disc 33 at no cost. Under these circumstances, by inserting the smart card 10 of FIG. 10 into the smart card reader 1, the visual display unit 20 is able to access the cassette 32 or video disc 33 and display the information concerning the drugs indicated by pressing the corresponding indicium 13 on the smart card 10 of FIG. 10.

Furthermore, the visual display unit 20 can be connected via the Internet, telephone or fax modem or any other modern communication mechanism, to a drug sales organisation including a home delivery service. Under these circumstances, the smart card 10 of either FIG. 9 or FIG. 10 is able to be inserted into the reader 1 and either the original supply or a repeat supply, can be dispensed interactively via electronic commerce. The number of repeats dispensed is incremented on each occasion on which a repeat is dispensed so that the smart card 10 continues to store the number of repeats initially authorised, the number of repeats dispensed to date and the number of repeats still available.

The on-line order for another dispensing of the drug (for example in the event of manual initial dispensing) can be interactively filled out on the visual display unit 20 by the patient and requires only an electronic signature to confirm the order. This is preferably done by means of signing an electronic challenge with the patient's private key to complete the order. This is a public key cryptography technique for authentication which is well known to those skilled in the computing arts. At the same time standard checks, such as that the order date is less than the expiry date of the prescription or that the frequency of ordering is not more than some anticipated frequency of ordering (to prevent deliberate overdosing) can be applied.

The connection of the visual display unit 20 with the Internet or other form of electronic communication also enables additional functions to be provided. For example, the drug company's web page is able to be accessed with a wealth of information about the drug, clinical trials, the approval process which the drug underwent, etc. The patient is also able to get in touch with a call centre, for example to answer queries such as the suitability of the drug in particular circumstances such as during a bout of influenza.

Similarly, if the conventional chemist shop is connected to the Internet then at the time of manually filling the prescription the chemist is also able to access the web page of the drug company, etc.

Furthermore, the act of dispensing the drug can also be used to trigger updating of the computer records maintained by the chemist shop so that the stock of the particular drug on hand is automatically adjusted for the sale, and a sales invoice is drawn up for payment, possibly by credit card.

In addition, many government financial assistance schemes require a cumulative record of subsidised drug purchases (a pharmacy card) to be maintained. This function can be easily included, particularly in the card of the type of FIG. 10.

In systems where diagnosis is performed by or with the aid of computer processing, the prescribing of drugs may be performed by some automated arrangement, such as a computer, thereby possibly excluding the medical practitioner from some embodiments. Further, where dispensing apparatus is provided and configured for dispensing drugs and the like, the smart card of the preferred embodiment may be inserted into the dispensing apparatus for providing the appropriate drugs to the patient, thereby possibly excluding the chemist from some embodiments. For example, since the smart card 10 is relatively small, it can be placed within a conventional cardboard package which contains the drug and/or be provided with an aperture 99 (FIG. 10) which enables the smart card to be attached by means of a cord or the like to the actual drug container.

Figure 18:
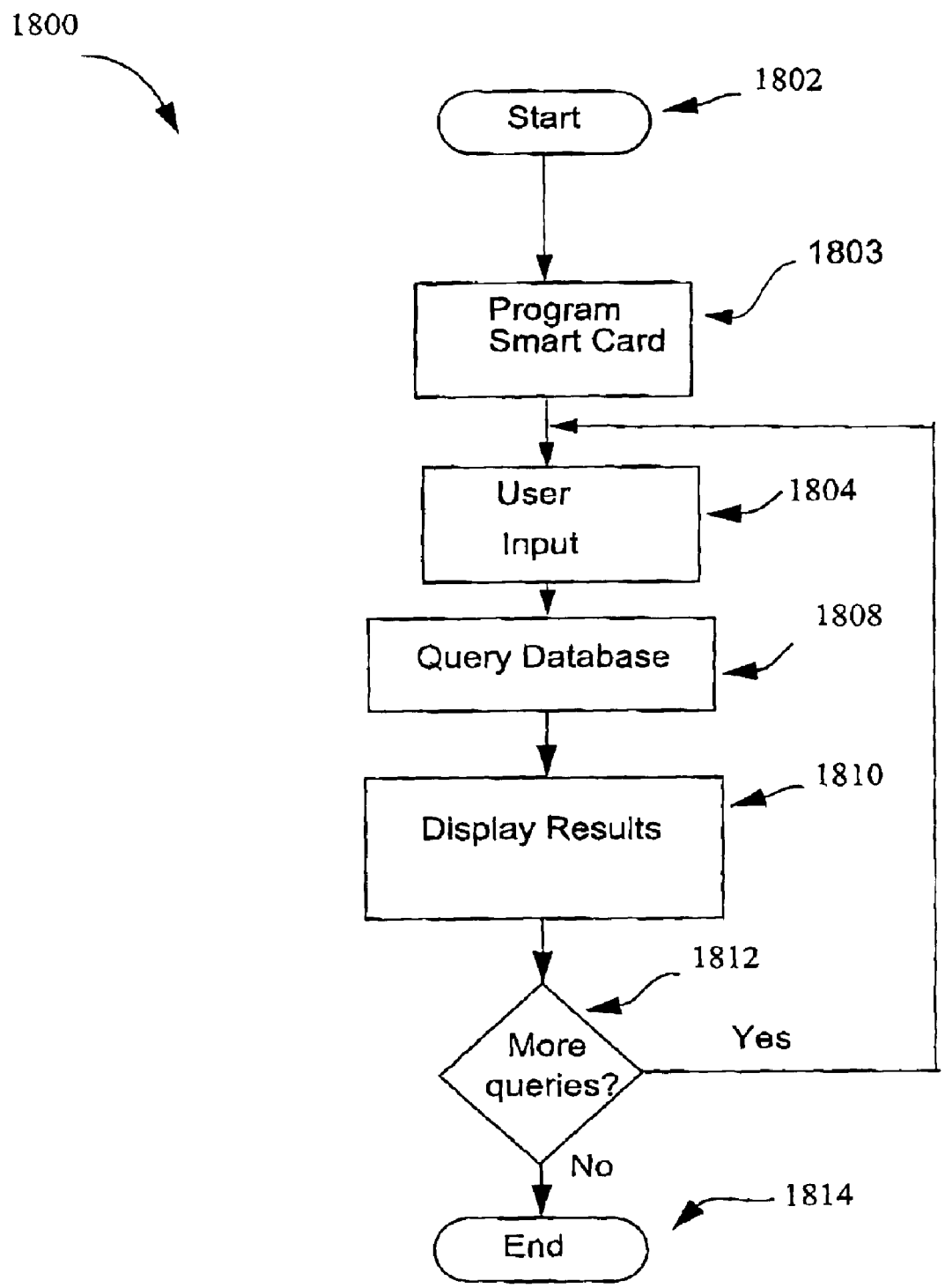
FIG. 18 is a flow chart showing a method of prescribing and dispensing a drug.

Turning now FIG. 18, there is shown a method 1800 of prescribing drugs and a dosage regime in accordance with another embodiment. The method commences at step 1802, where any necessary parameters are initialised. The method then proceeds to step 1803, where the third party or end user programmes the smart card 10. In this particular embodiment, the third party may be a medical practitioner or a chemist or both, and the end user is the patient. During this step 1803, the third party enters the patient details, the name or ID number of the drug being prescribed, the desired dosage rate, no. of repeats and other related information. The third party can also enter SQL commands for formulating queries for accessing and displaying the above mentioned drug information. This data and the associated mapping data of the corresponding indicia are then loaded into the table stored in the memory of the smart card as described previously. The indicia are printed on the card in the manner as described previously. In this particular embodiment, one or more "buttons" on the smart card designates the information (on the drug) that is to be displayed. Other buttons may enable a SQL query to be formulated utilising this information. For example, the user may select a combination of buttons thus formulating a SQL query of the drug information desired. The smart card may have a number of buttons for formulating such a query, eg "AND", "OR", and "ENTER" (to complete the query). Another "button" on the smart card may enable the user to order further repeats of the drug. After the smart card has been programmed, the method proceeds to step 1804.

During step 1804, the user selects any one of the indicia on the smart card corresponding to the desired service he/she wishes to be activated. Typically, the user will select a button relating to information to be displayed. For example, the user may select Drug History (see FIG. 9). Upon selection, the method then formulates 1808 a query based on the user's selections and displays 1810 the results on the visual display device 20, such as a personal computer. For example, the personal computer formulates the query and displays the drug history of the patient. The method then proceeds to decision block 1812, where the method determines if the user wishes to make a further query. If the user wishes to make a further query, the method returns to step 1804, otherwise the method terminates. The method may be modified to incorporate steps for ordering further repeats of the prescribed drugs. In this case, a command is forwarded to the personal computer, which then orders the drug by e-mail.

Two further embodiments of the present invention will now be described. The first embodiment relates to cooking lessons and the second to a woodworking tutorial.

As will be explained hereafter in accordance with the embodiments described with reference to FIGS. 11 and 12, the smart card programmer 30 and PC 31 are normally located at the premises of a publisher, ingredients supplier, or similar commercial enterprise which supplies commercially, or perhaps gives away, the smart cards 10, 100, 200. The smart card reader 1 and visual display unit 20 are located at the home of the user. Preferably, the visual display unit 20 is coupled to the Internet or a digital TV cable network. The visual display unit 20 can also include a VCR slot 22 and CD drive for receiving a video cassette 32 or video disc respectively.

Figure 11:
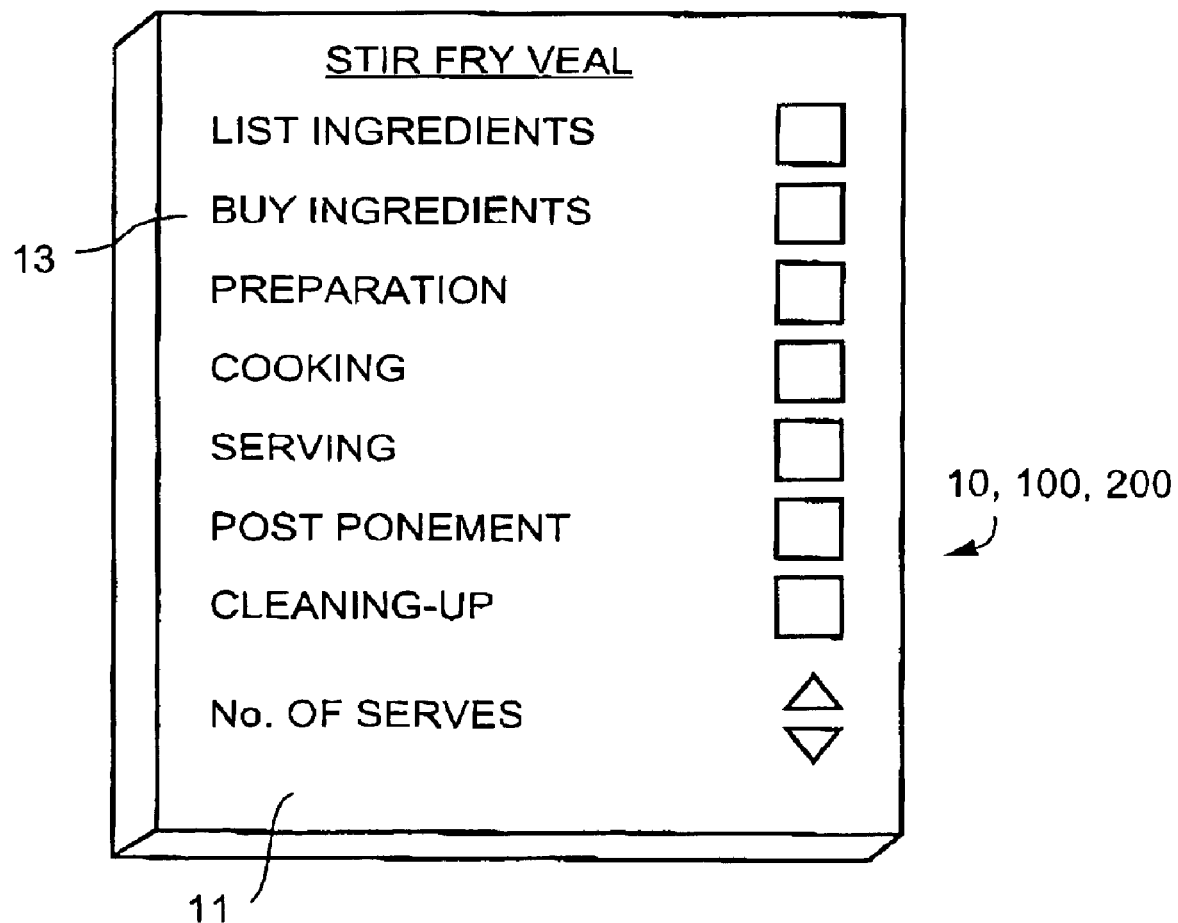
FIG. 11 is a plan view of the front of a smart card relating to a particular meal.

Turning now to FIG. 11, there is shown a further embodiment of the smart card 10, (100 or 200), which is provided on its front face 11 with indicia 13 relating to a particular meal, in this example a stir-fry veal dish, which is only one of a multitude of dishes, each described in detail on a web site of the Internet or a site of a digital TV network. Alternatively, each of the meals is described on the video cassette 32 or video disc 33. Firstly, the user inserts the smart card 10 into the smart card reader 1, and then selects the indicia reading "STIR-FRY VEAL". This results in data corresponding to this "label" being transmitted from the web site, network site, video cassette or video disk as appropriate to the visual display unit 20 so that the first image, for example of the final prepared meal for this dish, is displayed on the visual display unit 20.

By navigating through various ones of the indicia 13 as indicated in FIG. 11, the user can result in corresponding portions of the cooking tutorial being displayed on the visual display unit. As indicated in FIG. 11, these portions of the tutorial can include a list of the ingredients, the preparation of the ingredients, the cooking of the ingredients, the serving of the cooked meal, the actions to be taken in the event of some postponement, eg one of the prospective diners being delayed in traffic, and any special cleaning up requirements such as soaking prior to placing in a dishwasher, etc.

The functionality of the smart card 10 is not limited to merely provision of a menu, or bookmarking function. Since the smart card reader 10 and/or the visual display unit 20 includes computing power, interactive functions can be provided as well. For example, if the indicium 13 reading "No. OF SERVINGS" is selected, the number of servings displayed on the visual display unit 20 can be either increased or decreased thereby resulting in the listed ingredients also increasing or decreasing in accordance with the number of intended servings.

Furthermore, the visual display unit 20 can be connected via the Internet, telephone or fax modem, or any other modern communication mechanism, to a home delivery and sales service so that if the number of servings are set and the indicium reading "BUY INGREDIENTS" is selected, then an electronic order is placed with the service provider so that the ingredients can be ordered, paid for via an account or credit card facility, and delivered to the home of the user. In the course of this activity, the visual display unit 20 can display the prices, ordering information and so on.

The applications in this connection are only limited by the imagination so that the provider of the smart cards can also provide promotional indicia which enables, for example, cooking utensils to be purchased in addition to the ingredients. In this way advertising for associated promotions or related services or products is able to be directed at users.

Figure 12:
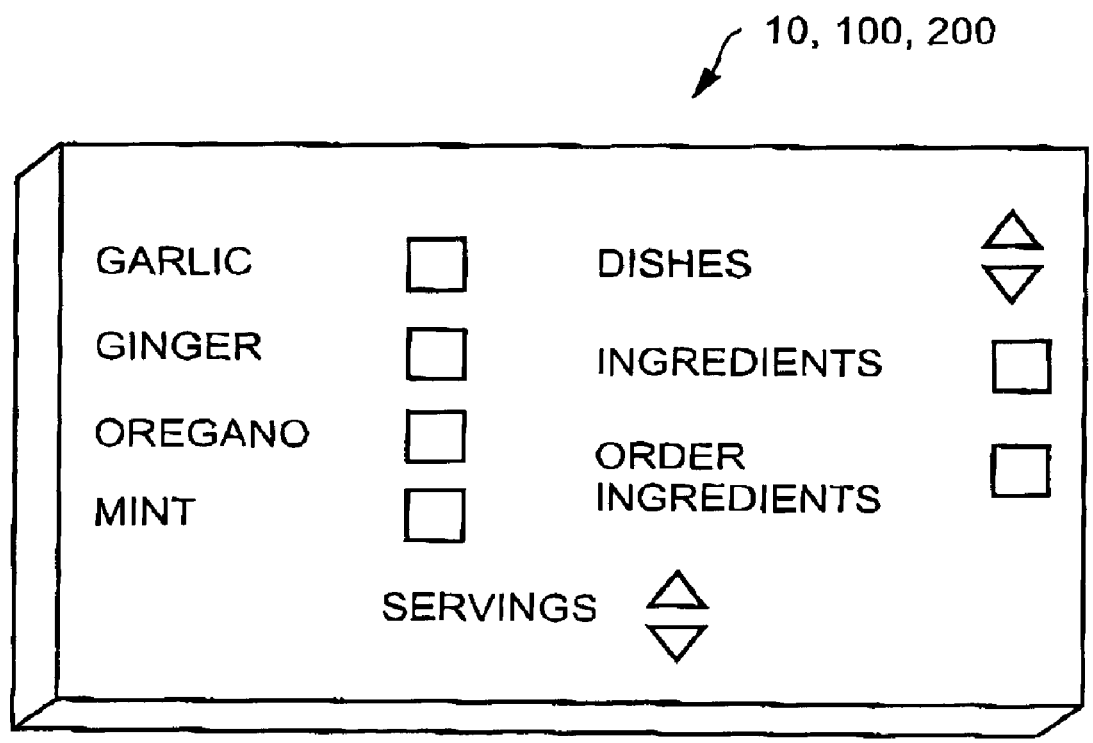
FIG. 12 is a front perspective view of a smart card relating to dishes prepared utilising particular selected flavourings.

Turning now to FIG. 12, a further embodiment of smart card 10 is illustrated, however in this instance rather than a particular recipe as in FIG. 11, the smart card 10 of FIG. 12 is intended to enable the user to browse through all the recipes stored on the video cassette 32 or video disc 33 to select those which contain particular flavourings. Thus if the indicium reading "GINGER" is selected from the smart card 10 of FIG. 12, then all the dishes included in, say, the video disc 33 which include ginger as a flavouring ingredient, are able to be displayed on the visual display unit 20. These can then be browsed by means of selecting either the "up" or "down" triangular indicium opposite the word "DISHES" so that the user can select one of all the various dishes which utilise the flavouring ingredient of ginger. As before, the number of servings can be adjusted, the ingredients displayed and ordered, etc.

In a still further embodiment, a woodworking tutorial is provided on a web site of the Internet. The tutorial is able to be accessed via the two smart cards. The first smart card has a reference to the various projects covered in a sequence of the tutorials such as bookcase, stool, bench, chair, table, etc. The second smart card has a reference to the various techniques used in the tutorials such as planing, dovetailing, gluing, sanding, routing, etc. These two smart cards are analogous to the smart cards of FIGS. 11 and 12 respectively.

In addition, the ingredients in the recipe are analogous to the materials used in construction and are able to be purchased electronically by the user. A similar analogy applies in respect of cooking utensils and woodworking tools, calculating the size of food portions/servings and adjusting the length of shelving, etc. Similarly, pacific maple, oregon, radiata pine, etc are analogous to ginger, mint, garlic, etc.

The extension of the present invention to other tutorial subjects such as metal work, woodturning, pottery, etc will be apparent to those skilled in the educational arts.

Figure 20:
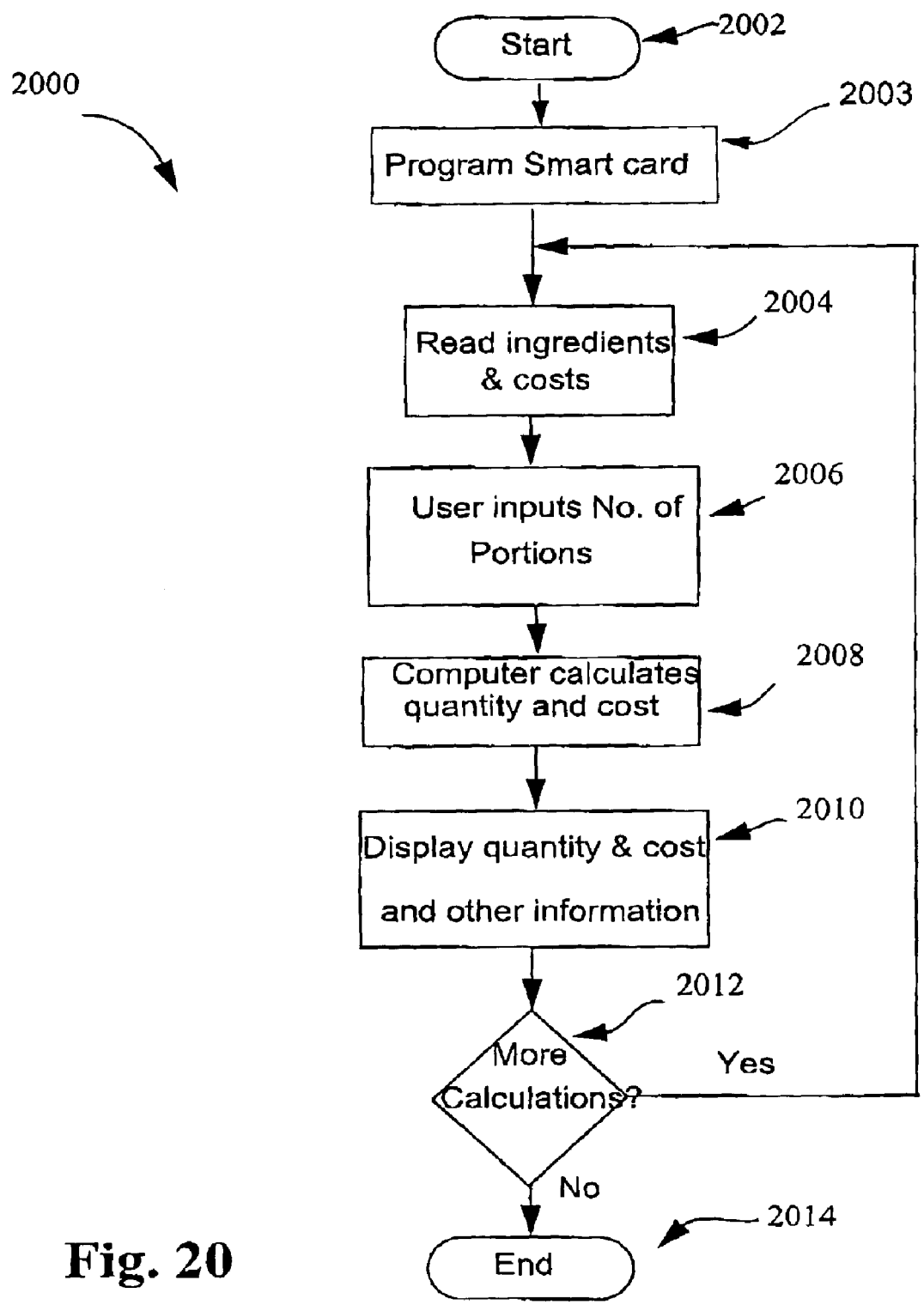
FIG. 20 is a flow chart showing a method of self education.

Turning now to FIG. 20, there is shown a flow chart of a method of self education in accordance with another embodiment. The method commences at step 2002, where any necessary parameters are initialised. The method then proceeds to step 2003, where a third party programmes the smart card 10. During this step 2003, the third party enters the information relating to the self education, which in this particular case concerns cooking lessons for a particular meal. Typically the information concerning the cooking lessons is located remotely on the Internet or a mass storage device. The third party programmes the smart card by including pointers to this information. Thus when the user presses the appropriate button, the information on the Internet or mass storage device is displayed on the visual display device 20. The third party can also enter SQL commands for formulating queries for accessing and displaying the above-mentioned information. The third party can also programme the smart card to perform functions other than display. Since the smart card reader and/or visual display device include computing power, interactive functions can be provided as well. This data and the associated mapping data of the corresponding indicia are then loaded into the table stored in the memory of the smart card as described previously. The indicia are printed on the card in the manner as described previously. In this particular embodiment, one or more "buttons" on the smart card refers to information to be displayed on the visual display device 20. Other buttons may enable a SQL query to be formulated. For example, the user may select a combination of buttons thus formulating a SQL query of the information listed on the card. The smart card may have a number of buttons for formulating such a query, eg "AND", "OR", and "ENTER" (to complete the query). Other buttons may enable interactive functions. After the smart card has been programmed, the method proceeds to step 2004.

During step 2006, the user selects any one of the indicia on the smart card corresponding to the desired service he/she wishes to be activated. Typically, the user will select 2006 the button indicating the number of portions to be served in preparing the meal (see FIG. 11). Upon selection, the reader or visual display unit 20 calculates 2008 the quantity of ingredients to be used in preparing that meal and the cost of those ingredients. The method then displays 2010 the quantity and cost and other information for the end user's information. The method then determines if there are any more calculations to be performed. If there are, the method returns to step 2006, otherwise the method terminates. The method can be modified for performing interactive functions as would be apparent to the person skilled in the art.

As will be explained hereafter in accordance with the further embodiments described with reference to FIGS. 13 and 14, the smart card programmer 30 and PC 31 are normally located at the premises of a copyright agency, media supplier or similar commercial enterprise which supplies commercially, or perhaps gives away, the smart cards 10, 100, 200. However, the smart card reader 1 and visual display unit 20 are located at the premises of the compiler together with a video cassette 32 or video disc 33 which are respectively insertable into the VCR slot 22 and the CD drive 23 of the visual display unit 20.

Figure 13:
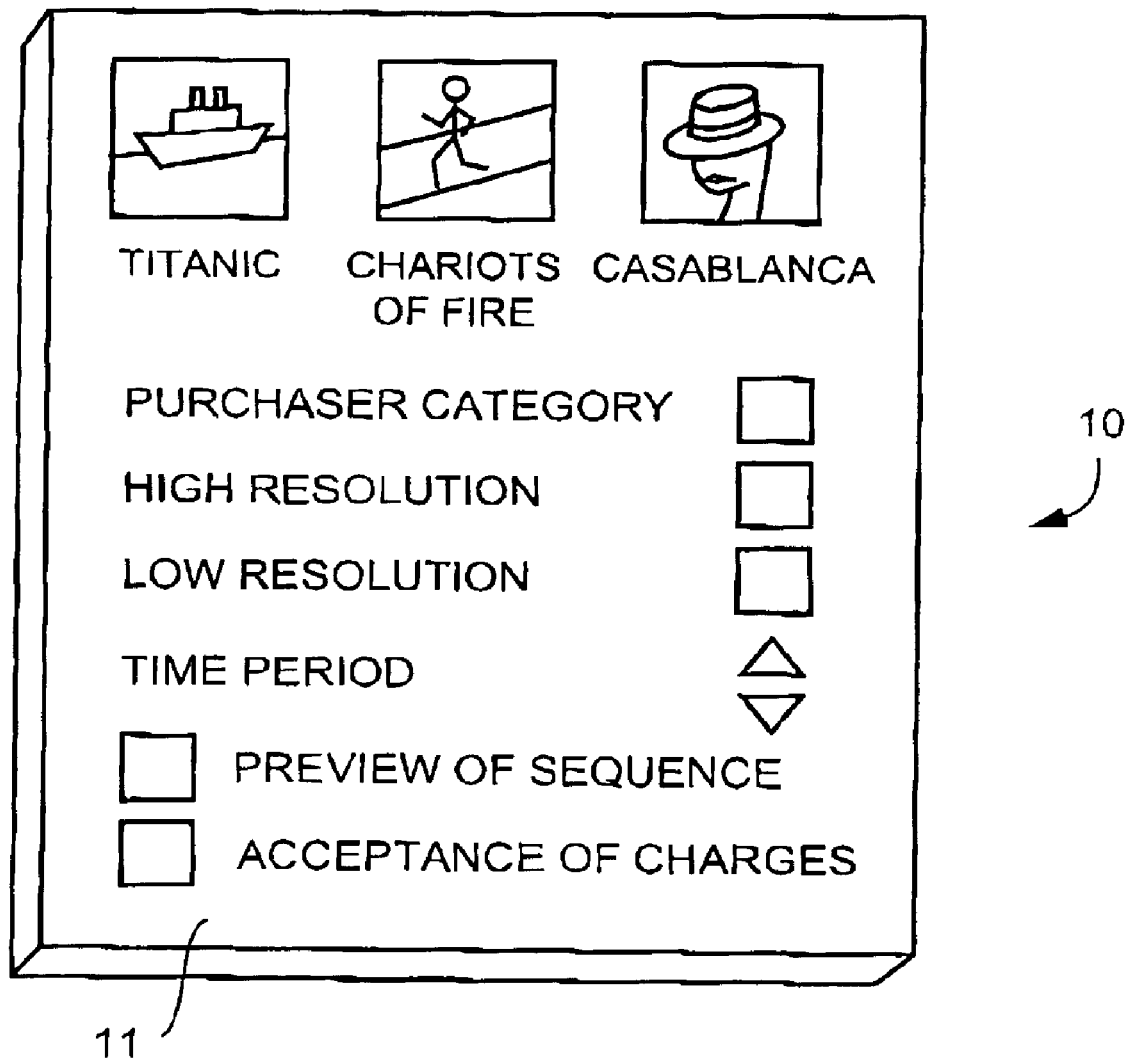
FIG. 13 is a plan view of the front of a smart card relating to a particular movie supplier.

Turning now to FIG. 13, there is shown a smart card 10, (which is also understood to include the other versions of the smart card 100 or 200), which is created by a copyright agency which wishes to earn royalty income through the sale of the right to use small clips of film from movies in its repertoire such as TITANIC, CHARIOTS OF FIRE and CASABLANCA. By inserting the smart card 10 into the smart card programmer 30, the copyright agency is able to load data into the smart card 10 corresponding to the film clips available for licence. In addition pricing data, as will be explained hereafter, is also loaded into the smart card 10. Printed onto the front surface 11 of the smart card 10 are various indicia 13 which indicate both the content and the uses to which the smart card 10 can be put. After being loaded with the data the smart card 10 is given, or possibly sold at a nominal price, to compilers who are prospective users of the movie clips.

The compiler, after receiving the smart card 10 inserts same into the smart card reader 1 and is then able to utilise the data stored in the smart card 10. For example, by pressing the indicium corresponding to PURCHASER CATEGORY the compiler is able to view on the visual display unit 20 the various possible categories provided by the copyright agency. By repeated pressing of the PURCHASER CATEGORY indicium, the various categories can be scrolled and one of the desired categories selected by pressing the acceptance of charges indicium.

Similarly, by pressing the TITANIC indicium and then the PREVIEW OF SEQUENCE indicium, various popular sequences from the film TITANIC are able to be previewed. There are three possible sources for the data to be displayed on the visual display unit 20. The first possibility is that the sequences are stored within the smart card 10 itself. The second possibility is that the visual display unit 20 downloads the sequences via the Internet or similar communication link with the copyright agency. The third possibility is that the copyright agency also supplies either the video cassette 32 or video disc 33 on which the sequences are stored.

The use of the TIME PERIOD indicium enables the length of the sequence to be increased or decreased at will by the compiler until the compiler is satisfied with the selection. Similarly, either the HIGH RESOLUTION indicium and LOW RESOLUTION indicium is pressed to indicate the intended quality of the material to be supplied. Finally, pressing the ACCEPTANCE OF CHARGES indicium enables the selected video sequences to be loaded onto a video cassette 32 or video disc 33 of the user which then provides the storage medium within which the compilation is stored for future use.

Figure 14:
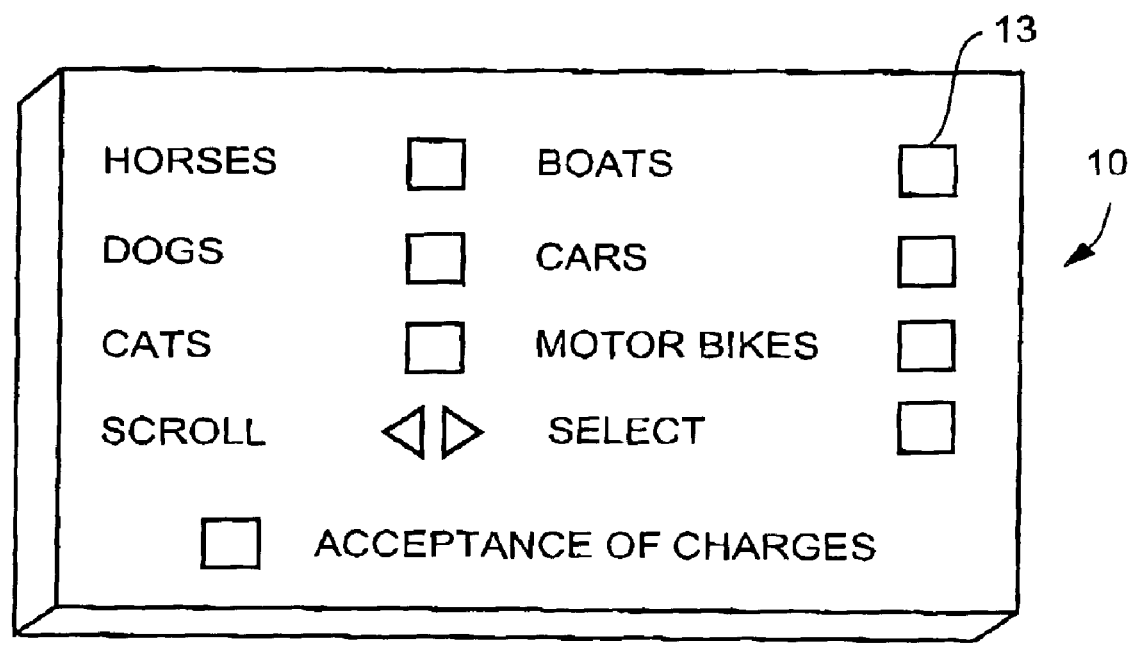
FIG. 14 is a front perspective view of a smart card relating to still photographs supplied via a second supplier.

Turning now to FIG. 14, a still further embodiment of a smart card 10 is illustrated. In this instance the supplying organisation is supplying still pictures and has previously loaded a sequence of "thumb nails" being low resolution small size images into the smart card 10. By the user placing the smart card 10 into the smart card reader 1, and pressing the category of images to be selected, the user is able to scroll through the various images which are displayed in turn on the visual display unit 20. Pressing the SCROLL indicium enables the images to be browsed and pressing the SELECT indicium enables the corresponding selected image to be downloaded. Again the downloading can be from either of the three sources mentioned above. Finally, again pressing the ACCEPTANCE OF CHARGES indicium completes the commercial transaction.

As an example of a commercial transaction, a promotional video cassette 32 produced by a compiler may contain ten seconds of a lead in from the TITANIC movie, an eight second extract from the CHARIOTS OF FIRE movie from the smart card 10 of FIG. 14, and finish with a still shot of a boat contained in the smart card 10 of FIG. 8. If the rate for the TITANIC video is a low resolution rate of 0.05 cents per second and the CHARIOTS OF FIRE portion of a high resolution rate of 0.2 cents per second and the cost of the boat still photograph is five cents, then the total cost of the licence fee for the compiled material is $$10 \times 0.05¢ + 8 \times 0.2¢ + 5¢ = 0.5¢ + 1.6¢ + 5¢ = 7.1¢$$

In addition, because the system contains computing power, for example within the visual display unit 20, the compiler can also determined that a specific budget is not to be exceeded. In this way, the length of particular clips may be increased or decreased in accordance with their price so as to lengthen or shorten the material from various sources in order to maintain the total cost within some predetermined limit.

Figure 19:
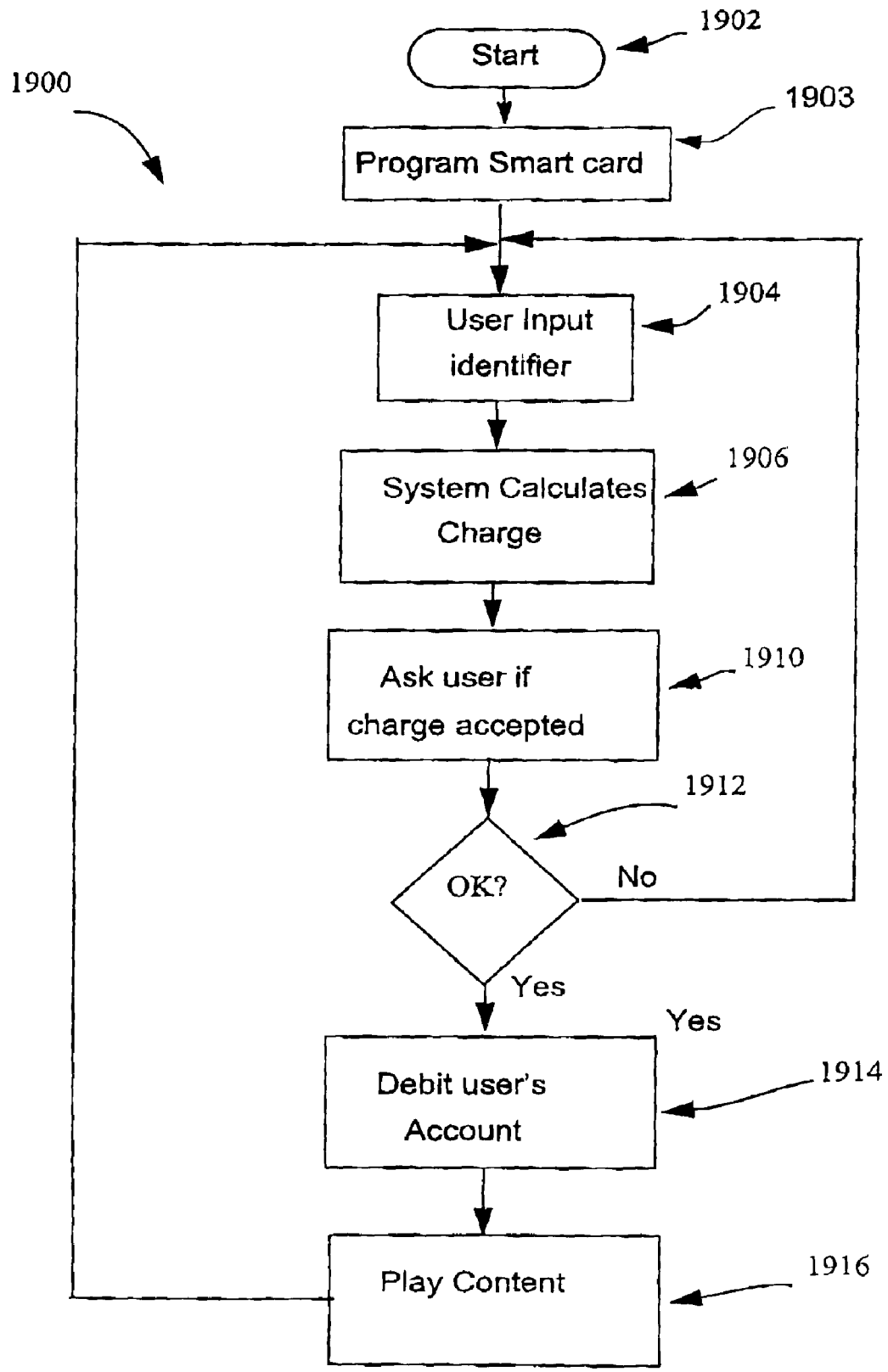
FIG. 19 is a flow chart showing a method of determining content access payment for a compilation work.

Turning now FIG. 19, there is shown a flow chart of a method of determining content access payment for a compilation work. The method commences at step 1902, where any necessary parameters are initialised. The method then proceeds to step 1903, where the third party programmes the smart card 10. During this step 1903, the third party inputs data for playing film clips and associated royalty charges for using said film clips and other information. Preferably, the film clip itself is not stored on the smart card, but a pointer is stored, which points to the location of the film clip on a mass storage device on the Internet. This data and the associated mapping data of the corresponding indicia are then loaded into the table stored in the memory of the smart card as described previously. The indicia are printed on the card in the manner as described previously. In this particular embodiment, one or more "buttons" on the smart card designate the film clips. In this case, the data entered on the smart card can include the Command: Play "file", which causes a television to play the film clip relating to that button. Other buttons may relate to interactive functions for determining the cost of using that film clip. Other "buttons" on the smart card may enable the user to select different types of resolutions of the film clips. After the smart card has been programmed, the method proceeds to step 1904.

During step 1904, the user selects any one of the indicia on the smart card corresponding to the desired service he/she wishes to be activated. Typically, the user will select a film clip he/she desires to use. The method then calculates 1906 the charge of the film clip(s) the user has selected. The method then proceeds to step 1910, where the method asks the user whether the charge is accepted. If the charge is accepted 1912, the method proceeds to step 1914, where the user's account is debited and the film clip is played 1916. The method continues until the smart card is removed from the smart card reader.

INDUSTRIAL APPLICABILITY

The preferred embodiments of the present invention find application in the provision of services in general and to home entertainment equipment arts, prescription and dispensing of drugs by medical practitioners and chemists respectively, tutorial and self-education arts, and in the media arts and multi-media, in particular.

The foregoing describes only a number of embodiments of the present invention and modifications may be made without departing from the scope of the present invention.

We claim:

1. A method of providing services using a smart card, wherein said method comprises the steps of:

generating a plurality of data, wherein each said data comprises information for activating a service associated with an electrical apparatus;

generating an indicium associated with each said data;

programming a smart card by loading said plurality of data into a memory of said smart card;

generating a plurality of mapping data, wherein each said mapping data indicates a location on the surface of said smart card to which an associated said indicium is to be applied;

linking said plurality of data to corresponding said mapping data of said indicia;

programming the smart card by loading said mapping data into the memory of said smart card;

applying said indicia to said surface of the smart card at the locations of the mapping data;

selecting any one of said indicia on the smart card upon loading said smart card into a smart card reader; and activating, when any one of said indicia on the smart card upon loading said smart card into a smart card reader is selected, said service associated with said selected indicium.

2. A method as claimed in claim 1, wherein a plurality of said data comprise title, time and channel information pertaining to a time of broadcast or other reproduction of similar programmes on said electrical apparatus, and each of said corresponding indicium on the surface of said card indicating the nature of the similarity of said programmes, said electrical apparatus comprises a recording apparatus, and the activating step comprises the sub-steps of:

(1) using the data stored in said smart card to activate the recording apparatus to record said programmes when broadcast or otherwise reproduced and logging the location of said record in said smart card memory, and (2) using the stored data in said smart card to activate the recorded programmes as desired.

3. The method as claimed in claim 2, comprising the further sub-step of:

(1A) prior to step (2) but after step (1), inserting said smart card into the smart card reader to display on a visual display unit all the recorded programme titles of a group of said similar programmes.

4. The method as claimed in claim 3, comprising the further step of:

(1B) after step (1A), selecting a programme to be viewed from amongst the displayed titles of said group of programmes.

5. The method as claimed in claim 4, comprising the further step of:

(3) storing in said smart card the selected title.

6. The method as claimed in claim 5, comprising the further step of:

(4) on request displaying the stored history of selected titles.

7. The method as claimed in claim 1, said method comprises the further step of:

determining a drug and its dosage regime to be prescribed; and said step of generating a plurality of data comprises generating said information for activating said service associated with said electrical apparatus pertaining to said drug and dosage regime; and said service comprising accessing and displaying said data pertaining to said drug and dosage regime.

8. The method as claimed in claim 7, comprises the further step of:

dispensing said drug according to the information in said smart card at a drug dispensing location, and said service comprises accessing and displaying said data pertaining to said drug and dosage regime at the drug dispensing location.

9. The method as claimed in claim 7, comprises the further step of:

dispensing said drug by transporting same from a drug dispensing location to a user of said drug; and said service comprises remotely accessing and displaying said data pertaining to said drug and dosage regime via a communications link to a smart card reader remote from the drug dispensing location.

10. The method as claimed in claim 7, wherein said information relates to the side effects of said drug.

11. The method as claimed in claim 7, wherein said plurality of data comprises one or more pointers to data regarding the side effects of said drug.

12. The method as claimed in claim 1 or 7, wherein said plurality of data comprises a monotonically increasing time stamp and cryptographic key, which identifies a programmer of said smart card.

13. The method as claimed in claim 1 or 7, wherein said method comprises the further step of:

creating a label for said smart card comprising at least one indicium indicating the contents of said smart card memory.

14. The method as claimed in claim 7, wherein said plurality of data comprises the drug and associated dosage regime of all drugs prescribed for a user.

15. The method as claimed in claim 1, wherein said step of activating said service comprises the sub-steps of:

accessing pointer data stored in the smart card via the smart card reader, utilising the accessed pointer data to display on a visual display unit educational data from a tutorial data storage means, and utilising the displayed educational data to carry out an activity in accordance with the tutorial stored in said tutorial data storage means.

16. The method as claimed in claim 15, wherein said step of activating said service comprises the further step of:

repeating said steps of accessing pointer data, utilising the accessed pointer data, and utilising the displayed educational data in respect of a sequence of educational steps culminating in preparation of a project.

17. The method as claimed in claim 15 or 16, wherein said step of activating said service comprises the further step of:

calculating constituent sizes and/or volumes and/or weights based upon said displayed educational data.

18. The method as claimed in claim 17, wherein said visual display unit is connected, via a communications link to a constituent supplier and said step of activating said service comprises the further step of, prior to step of utilising the displayed educational data:

ordering via said communications link one or more of said constituents comprised in said displayed data.

19. The method as claimed in claim 15, wherein said step of activating said service comprises the further steps of, prior to step of utilising the accessed pointer data:

accessing pointer data in relation to a specific constituent;

utilising the accessed pointer data to display on said visual display unit a plurality of tutorial projects each of which comprise said specific constituent, and selecting one of said displayed projects.

20. The method as claimed in claim 1, wherein said service comprises determining content access payment for a compilation work formed from a plurality of copyright protected works each having a corresponding copyright royalty payable and having a corresponding said indicia indicating the nature of the work, and wherein said programming step comprises storing the copyright royalty data of each copyright protected work in a smart card memory location, and said activating step service comprises the sub-steps of:

permitting a user to specify via said indicia the identity of the plurality of works to be used in said compilation work, and calculating the total royalty payable in respect of the compilation work.

21. The method as claimed in claim 20, wherein said step of activating said service further comprises the sub-steps of:

prior to the step of specifying the identity of the plurality of works, including in said copyright royalty data a royalty specified on a per time period basis, and prior to the step of calculating the royalty payable, permitting said user to indicate the duration of each of the identified works to be used in said compilation work.

22. The method as claimed in claim 20, wherein said step of activating said service further comprises the sub-steps of:

prior to the step of specifying the identity of the plurality of works, including in said copyright royalty data a royalty specified on a per time period basis;

prior to the step of calculating the royalty payable, permitting said user to specify a maximum total royalty payable; and modifying the step of calculating the royalty payable to calculate the allowable duration of each of the individual works forming said compilation work.

23. The method as claimed in claim 20, wherein said step of activating said service further comprises the sub-steps of:

prior to the step of specifying the identity of the plurality of works, including in said copyright royalty data a plurality of royalty rates each corresponding to one of a plurality of different resolution versions of each said copyright protected work, and prior to the step of calculating the royalty payable, requiring the user to specify the desired resolution of each of the identified works.

24. The method as claimed in claim 20, wherein said step of activating said service further comprises the sub-steps of:

prior to the step of specifying the identity of the plurality of works, including in said copyright royalty data the identity of the copyright owner or agency to whom the royalty for payment of the corresponding work is payable, and modifying the step of calculating the royalty payable to include a sub-total of the portion of the total royalty payable to each copyright owner or agency.

25. The method according to claim 1, wherein said services are provided by a party independent of any original manufacturer of the smart card.

26. A method of providing a first service from amongst competing services, said method comprising the steps of:

storing in each of a plurality of smart cards a plurality of enhancement activities as an adjunct to said first service, each of said enhancement activities being stored using a corresponding one of a plurality of stored data each associated with a corresponding one of a plurality of indicia, wherein each said stored data of a particular smart card is linked to corresponding mapping data indicating a location of the corresponding one of said indicia on a surface of said particular smart card, and wherein the corresponding mapping data is stored on the particular smart card, distributing a multiplicity of smart cards each to a prospective user of said first service, and during said first service requesting all users with said smart cards to enter same in a smart card reader and by selecting one of said indicia, partake of the corresponding enhancement activity.

27. The method as claimed in claim 26, wherein said first service comprises reproduction of a predetermined programme on an electrical apparatus.

28. The method as claimed in claim 27, wherein said enhancement activities comprise purchase of items related to said predetermined programme.

29. The method as claimed in claim 28, wherein said items are selected from the group consisting of toys, video cassettes, video discs and memorabilia.

30. The method as claimed in claim 28 or 29, comprising the further step of:

using said smart cards to initiate electronic commerce transactions.

31. The method as claimed in claim 26, comprising the step of printing on the exterior of said smart cards a scratch and win instant lottery ticket.

32. A system for providing services using at least one programmable smart card, said system comprising:

at least one programmable smart card comprising an electronic memory;

means for generating a plurality of data, wherein each said data comprises information for activating a service associated with an electrical apparatus;

means for generating a plurality of indicia each being associated with a corresponding one of said plurality of data;

a smart card programmer means for storing said plurality of data in said electronic memory;

means for generating a plurality of mapping data, wherein each said mapping data indicates a location on the surface of said smart card to which an associated said indicium is to be applied;

means for linking said plurality of data to corresponding said mapping data of said indicia;

means for storing said mapping data into the memory of said smart card;

means for applying said indicia to said surface of the smart card at the locations of the mapping data; and a smart card reader comprising a bay to receive said smart card and communications means to communicate with said electrical apparatus for activating said service associated with a selected said indicium.

33. A system as claimed in claim 32, wherein said services relate to entertainment selection, and said system comprises said communications means adapted to communicate with at least a visual display unit, and a media storage device containing a plurality of recorded programmes each able to be displayed on said visual display device, following a request made from said smart card received in said smart card reader.

34. A system as claimed in claim 32, wherein said services relate to prescribing and dispensing of drugs, and said system comprising:

a media storage device containing a plurality of display sequences each able to be displayed on said visual display device, wherein a user operates said programmer means to enter in said smart card a prescription for a drug and thereby store in said smart card data relating to said prescription and drug; and said communications means is adapted to communicate with at least the visual display unit so as to display information relating to said prescription and drug.

35. The system as claimed in claim 34, wherein said system comprises at least two said smart card readers and at least two of said visual display units, one said reader and said display unit being located at a first premises and another said reader and said display unit being located at a second premises.

36. The system as claimed in claim 34, including remote access means to remotely access the data stored in said smart card via a communications link.

37. The system as claimed in claim 32, wherein said services relate to self education, said system comprising said communications means to communicate with at least a visual display unit, and a media storage device containing a plurality of display sequences each able to be displayed on said visual display device, wherein each of said stored data points to a corresponding one of said stored display sequences, and each of said stored display sequences comprises educational data.

38. The system as claimed in claim 37, wherein said smart card programmer means is located at the promises of a supplier of said programmed smart cards and media storage devices and said smart card reader, and visual display device are located at the premises of a user.

39. The system as claimed in claim 37, wherein said communications means includes a communications link with a constituents vendor.

40. The system as claimed in claim 32, wherein said services relate to determining content access payment, said system comprising communications means to communicate with at least a visual display unit wherein each said stored data contains copyright royalty data of a corresponding copyright protected work indicated by indicia, and said smart card includes computation means to calculate a total royalty payable for the use of selected ones of said works used to form a compilation work.

41. The system as claimed in claim 40, including a media storage device containing said copyright protected works.

42. The system according to claim 32, wherein said services are provided by a party independent of an original manufacturer of the smart card.

* * * * *

UNITED STATES PATENT AND TRADEMARK OFFICE
CERTIFICATE OF CORRECTION

PATENT NO.     : 6,877,655 B1
DATED          : April 12, 2005
INVENTOR(S)    : Philip Keith Robertson et al.

It is certified that error appears in the above-identified patent and that said Letters Patent is hereby corrected as shown below:

Column 10,
Line 32, "genre" should read -- genres --.

Column 13,
Line 27, "be" should read -- by --; and
Line 43, "WORFARIN" should read -- WARFARIN --.

Column 19,
Line 10, "determined" should read -- determine --.

Column 20,
Line 24, "and" should be deleted.

Column 24,
Line 36, "promises" should read -- premises --.

Signed and Sealed this

Twentieth Day of September, 2005

JON W. DUDAS
*Director of the United States Patent and Trademark Office*